US012650089B2

(12) United States Patent (10) Patent No.: US 12,650,089 B2
Rohrmueller et al. (45) Date of Patent: Jun. 9, 2026

(54) DOSER MOUNT FOR EXHAUST AFTERTREATMENT SYSTEM

(71) Applicant: CUMMINS EMISSION SOLUTIONS INC., Columbus, IN (US)

(72) Inventors: Ralf Rohrmueller, Faulbach (DE); Thomas Kreser, Lohr (DE); Bolaji Suberu, Greenwood, IN (US); Masoud Ziabakhsh Deilami, Columbus, IN (US); Julian Nicolas Aljoscha Raupp, Waldbuettelbrunn (DE); Roozbeh Haghighi, Atlanta, GA (US); Omkar Tendolkar, Greenwood, IN (US); Kay Henning Schmidt, Lohr a Main (DE); Friedrich Johann Zapf, Karlstadt (DE)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 0 days.

(21) Appl. No.: 18/878,301

(22) PCT Filed: Jun. 27, 2023

(86) PCT No.: PCT/US2023/026284
§ 371 (c)(1),
(2) Date: Dec. 23, 2024

(87) PCT Pub. No.: WO2024/006240
PCT Pub. Date: Jan. 4, 2024

(65) Prior Publication Data
US 2025/0376936 A1    Dec. 11, 2025

Related U.S. Application Data

(60) Provisional application No. 63/356,128, filed on Jun. 28, 2022.

(51) Int. Cl.
F01N 3/20 (2006.01)
B01D 53/90 (2006.01)

(52) U.S. Cl.
CPC ........... *F01N 3/2066* (2013.01); *B01D 53/90* (2013.01); *F01N 2610/1453* (2013.01)

(58) Field of Classification Search
CPC F01N 3/2066; F01N 2610/1453; B01D 53/90
See application file for complete search history.

(56) References Cited

U.S. PATENT DOCUMENTS 8,087,239 B2 * 1/2012 Bugos ................... F01N 3/2066
239/128
8,261,537 B2 * 9/2012 Osbat .................... F01N 3/2066
239/132.3

(Continued)

FOREIGN PATENT DOCUMENTS

WO    WO2020/186034    9/2020

OTHER PUBLICATIONS

International Search Report and Written Opinion issued for PCT Application No. PCT/US2023/026284 issued Sep. 20, 2023.

*Primary Examiner* — Jesse S Bogue
(74) *Attorney, Agent, or Firm* — Foley & Lardner LLP

(57) ABSTRACT

A doser mount includes an annular body portion, a plurality of legs, and a plurality of projections. The annular body portion defines a central cavity. The plurality of legs protrude from a lower surface of the annular body portion and are configured to be coupled to an outer surface of an exhaust conduit. The plurality of projections extend from an upper surface of the annular body at a plurality of circumferential positions of the upper surface of the annular body.

17 Claims, 17 Drawing Sheets

(56) References Cited

U.S. PATENT DOCUMENTS

| 8,327,829 | B2 | 12/2012 | Keidel et al. | |
| 8,438,839 | B2 | 5/2013 | Floyd et al. | |
| 8,756,921 | B2 * | 6/2014 | Troxler | F01N 3/2066 |
| | | | | 60/274 |
| 8,997,463 | B2 * | 4/2015 | Bugos | B01D 53/90 |
| | | | | 60/303 |
| 9,341,100 | B2 * | 5/2016 | Petry | F01N 13/14 |
| 9,651,012 | B2 * | 5/2017 | Niaz | F01N 3/021 |
| 9,689,293 | B2 * | 6/2017 | van Vuuren | F01N 3/2066 |
| 9,896,981 | B2 * | 2/2018 | Kapale | F01N 13/1855 |
| 9,896,984 | B2 * | 2/2018 | Shank | F01N 3/2066 |
| 10,502,112 | B2 * | 12/2019 | Hatfield | F01N 3/2066 |
| 10,539,057 | B2 * | 1/2020 | VanVuuren | F01N 3/2066 |
| 10,655,523 | B2 * | 5/2020 | Upadhye | B01D 53/9418 |
| 10,933,387 | B2 | 3/2021 | Cvelbar | |
| 10,947,880 | B2 * | 3/2021 | Hatfield | F01N 3/2066 |
| 11,248,508 | B2 * | 2/2022 | Grünig | F01N 13/1844 |
| 11,391,193 | B2 * | 7/2022 | Arunachalam | F01N 3/24 |
| 11,555,437 | B2 * | 1/2023 | Hogan | F01N 13/1861 |
| 2010/0024406 | A1 * | 2/2010 | Pollitt | F01N 3/36 |
| | | | | 123/470 |
| 2013/0219871 | A1 * | 8/2013 | Crandell | F01N 3/2066 |
| | | | | 60/295 |
| 2014/0237998 | A1 * | 8/2014 | Fahrenkrug | F01N 3/2066 |
| | | | | 123/470 |
| 2016/0245142 | A1 | 8/2016 | Venkataraghavan et al. | |

* cited by examiner

DOSER MOUNT FOR EXHAUST AFTERTREATMENT SYSTEM

CROSS-REFERENCE TO RELATED APPLICATION

This application is a national phase of PCT Application No. PCT/US2023/026284, filed Jun. 27, 2023, which claims the benefit of and priority to U.S. Provisional Application No. 63,356,128, filed Jun. 28, 2022. The contents of these applications are incorporated herein by reference in their entireties.

TECHNICAL FIELD

The present disclosure relates generally to doser mounts for exhaust aftertreatment systems of internal combustion engines.

BACKGROUND

For an internal combustion engine system, it may be desirable to reduce emissions of certain components in exhaust produced by a combustion of fuel. One approach that can be implemented to reduce emissions is to treat the exhaust using an aftertreatment system. It is often desirable to mix exhaust with a reductant used to treat the exhaust. However, heat from the exhaust system may be transferred to the dosing module, which may damage the dosing module.

SUMMARY

In one embodiment, a doser mount includes an annular body portion defining a central cavity. The doser mount includes a plurality of legs protruding from a lower surface of the annular body portion. The plurality of legs are configured to be coupled to an outer surface of an exhaust conduit body. The doser mount includes a plurality of projections extending from the upper surface of the annular body portion at a plurality of circumferential positions of the upper surface of the annular body portion.

In one embodiment, an exhaust aftertreatment system includes a doser comprising an injector. The exhaust aftertreatment system includes a doser mount. The doser mount includes an annular body portion defining a central cavity. The doser mount includes a plurality of legs protruding from a lower surface of the annular body portion. The plurality of legs are configured to be coupled to an outer surface of an exhaust conduit body. The doser mount includes a plurality of projections extending from the upper surface of the annular body portion at a plurality of circumferential positions of the upper surface of the annular body portion. The doser is coupled to the doser mount such that the injector is received within the central cavity.

In one embodiment, an exhaust aftertreatment system includes an exhaust conduit body. The exhaust aftertreatment system includes a doser mount. The doser mount includes an annular body portion defining a central cavity. The doser mount includes a plurality of legs protruding from a lower surface of the annular body portion. The plurality of legs are configured to be coupled to an outer surface of an exhaust conduit body. The doser mount includes a plurality of projections extending from the upper surface of the annular body portion at a plurality of circumferential positions of the upper surface of the annular body portion. The plurality of legs cooperate with the exhaust conduit body to define a plurality of lower channels between the lower surface and the exhaust conduit body.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

Figure 1:
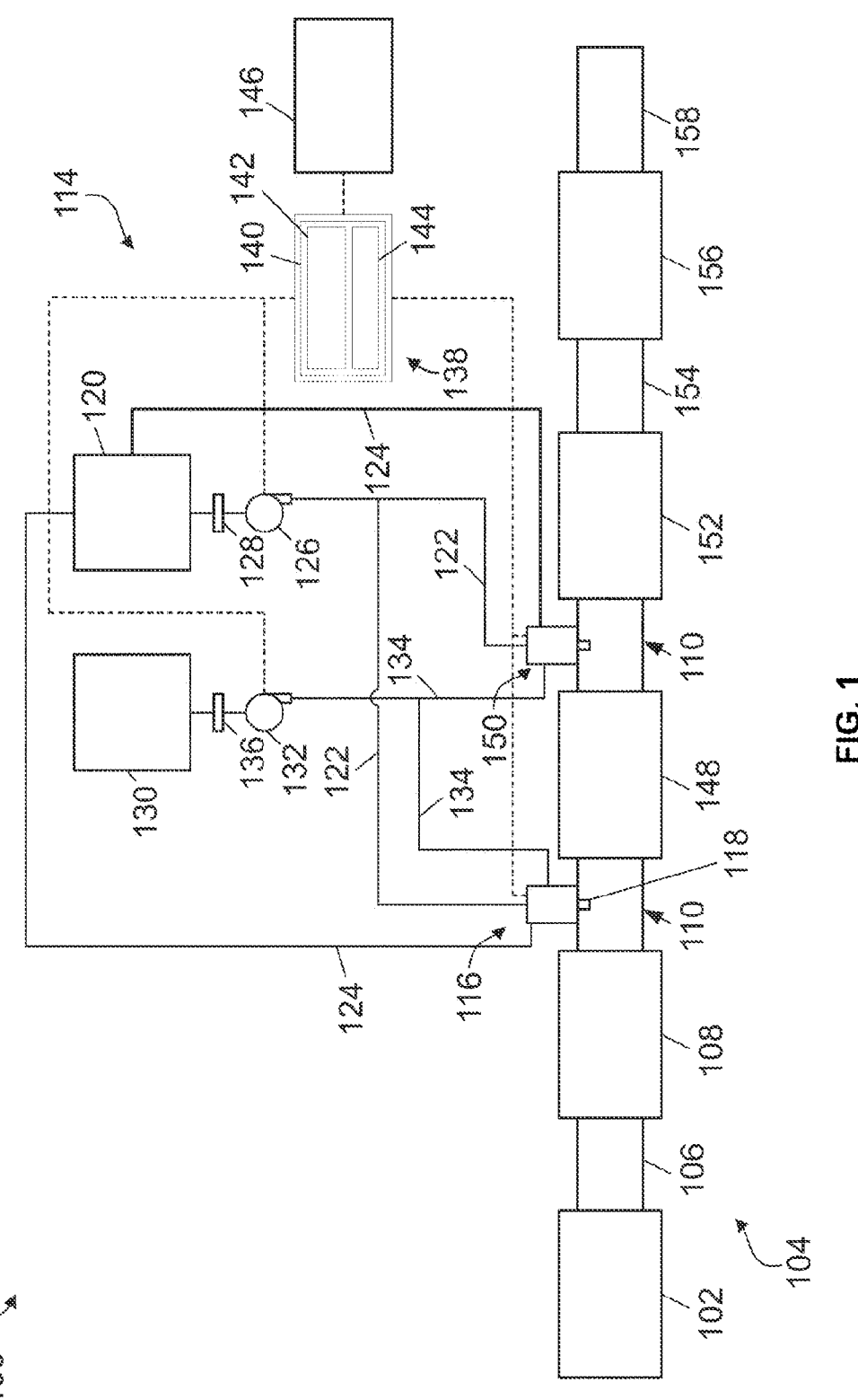
FIG. 1 is a schematic diagram of an example exhaust aftertreatment system including a doser mount.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for providing a doser mount for an exhaust aftertreatment system of an internal combustion engine. The various concepts introduced above and discussed in greater detail below may be implemented in any of a number of ways, as the described concepts are not limited to any particular manner of implementation. Examples of specific implementations and applications are provided primarily for illustrative purposes.

I. Overview

In order to reduce emissions and optimize performance of an internal combustion engine, it may be desirable to decrease a temperature of a dosing module (e.g., a doser) of an exhaust aftertreatment system. For example, it may be desirable to reduce heat transferred from an internal combustion engine system, for example, via a turbocharger, an exhaust conduit, and exhaust flowing therethrough, to the dosing module.

Implementations herein are related to an exhaust aftertreatment system that facilitates cooling of a dosing module such that the dosing module can operate desirably in high temperature environments. For example, the doser mount described herein is configured to reduce heat transferred to a dosing module as well as keep DEF backflow temperatures in acceptable ranges. The doser mount can reduce heat transferred from an exhaust conduit to a dosing module by reducing the area of contact between the exhaust conduit, the doser mount, and the dosing module. The doser mount can provide an open structure to allow for more air movement surrounding the dosing module and the doser mount to transfer the heat to the air instead of the doser mount and dosing module. The doser mount can also increase a distance of a heat transfer path such that the heat has to travel a further distance before reaching the dosing module. The doser mount can also include additional heat resistant sealings to reduce the amount of heat that is transferred to the dosing module and eliminate direct contact between the exhaust conduit and the dosing module. The implementations disclosed herein cool an exhaust conduit assembly via air and reduced conductive pathways to reduce an amount of heat transferred to the dosing module. The cooling may accomplished without the use of additional components (e.g., coolant lines).

Reducing the heat transferred to the dosing module allows for the dosing module to be disposed closer to a heat source within the system than would not be possible without such cooling. For example, because of the reduced heat transfer pathways and the ability of air to flow around the doser mount, the dosing module can be disposed proximate to an internal combustion engine, a turbocharger, or other components of an internal combustion engine system that generate heat. These cooling features reduce the heat transferred to the dosing module and protect the dosing module from damage that could occur due to high temperatures. The reduction in heat transferred to the dosing module also helps to keep the heat in the exhaust system to heat up catalysts and to avoid creating cool spots on conduit wall which can lead to DEF crystallization. The ability for a dosing module to be positioned close to the internal combustion engine and/or turbocharger of a system allows for the system to incorporate more dosing modules which can improve the efficiency and effectiveness of the exhaust aftertreatment system. For example, being able to position the dosing module closer to the heat source allows for the system to incorporate more dosing modules such that more reductant can be introduced into the exhaust to more fully treat the exhaust. The implementations disclosed herein may enhance desirable operation of a system employing one of the air-cooled doser mounts described herein.

The implementations disclosed herein can be used with DEF cooled or coolant-cooled dosing modules, which facilitates use of cheaper dosing technologies. Air cooling offers the advantage of locating the dosing module in hot exhaust temperature areas to take advantage of heat to decompose DEF. Furthermore, air cooling allows for adding a pressure sensor in the dosing module which can improve dosing accuracy and performance.

II. Overview of Exhaust Aftertreatment Systems

Figure 2:
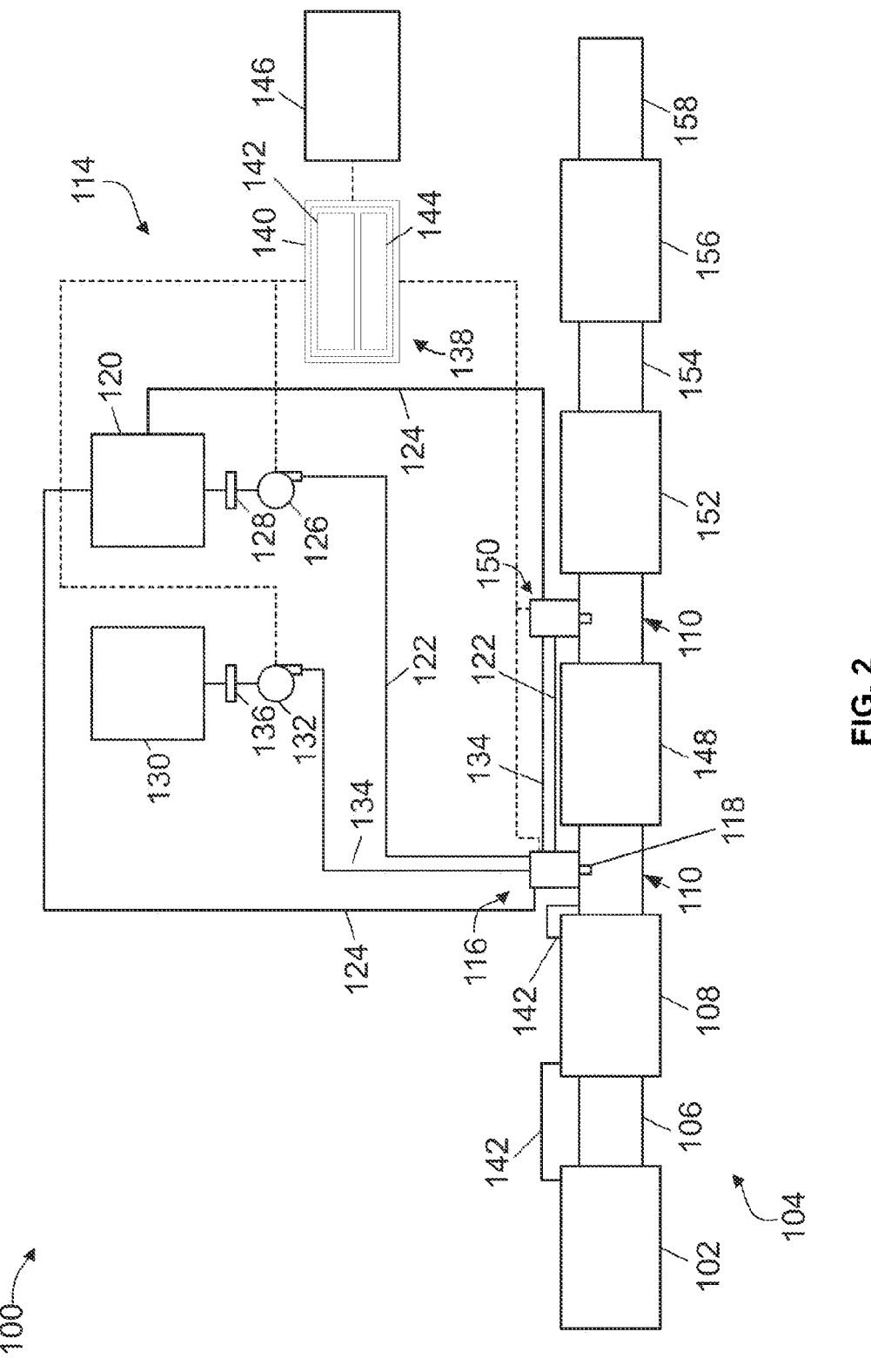
FIG. 2 is a schematic diagram of another example exhaust aftertreatment system including a doser mount.

FIGS. 1 and 2 depict an exhaust aftertreatment system 100 (e.g., treatment system, etc.) for treating exhaust produced by an internal combustion engine 102 (e.g., diesel internal combustion engine, gasoline internal combustion engine, hybrid internal combustion engine, propane internal combustion engine, dual-fuel internal combustion engine, etc.) according to various embodiments. The exhaust aftertreatment system 100 includes an exhaust conduit system 104. The exhaust conduit system 104 is configured to (e.g., structured to, able to, etc.) receive exhaust from the internal combustion engine 102 and provide the exhaust to atmosphere.

The exhaust conduit system 104 includes an upstream exhaust conduit 106 (e.g., line, pipe, etc.). The upstream exhaust conduit 106 is configured to receive exhaust from an upstream component (e.g., header, exhaust manifold, turbocharger, diesel oxidation catalyst, the internal combustion engine 102, etc.). In some embodiments, the upstream exhaust conduit 106 is coupled to (e.g., attached to, fixed to, welded to, fastened to, riveted to, etc.) the internal combustion engine 102 (e.g., the upstream exhaust conduit 106 is coupled to an outlet of the internal combustion engine 102, etc.). In other embodiments, the upstream exhaust conduit 106 is integrally formed with the internal combustion engine 102. As utilized herein, two or more elements are "integrally formed" when the two or more elements are formed and joined together as part of a single manufacturing step to create a single-piece or unitary construction that cannot be disassembled without an at least partial destruction of the single-piece or unitary construction.

The exhaust aftertreatment system 100 also includes a turbocharger 108. The turbocharger 108 is configured to receive exhaust from the internal combustion engine 102. While not shown, the turbocharger 108 also receives air and provides the air to the internal combustion engine 102. The turbocharger 108 utilizes energy from the exhaust produced by the internal combustion engine 102 to provide energy to air provided to the internal combustion engine 102. Specifically, the turbocharger 108 may pressurize the air provided to the internal combustion engine 102. In some embodiments, the turbocharger 108 includes a compressor wheel coupled to a turbine wheel via a connector shaft, where the exhaust produced by the internal combustion engine 102 spins the turbine wheel, which rotates the shaft and the compressor wheel to compress air provided to the internal combustion engine 102. By compressing the air, the turbocharger 108 may enable the internal combustion engine 102 to operate with increased power and/or efficiency.

The exhaust conduit system 104 includes an exhaust conduit assembly 110. The exhaust conduit assembly 110 defines an exhaust flow path. As shown in FIGS. 1 and 2, the exhaust conduit assembly 110 is coupled to the turbocharger 108. In other embodiments, the exhaust conduit assembly 110 is integrally formed with a housing of the turbocharger 108. In some embodiments, the exhaust conduit assembly 110 is disposed upstream of the turbocharger 108 (e.g., the exhaust conduit assembly 110 provides exhaust to the turbocharger 108, etc.). For example, the exhaust conduit assembly may be disposed between the internal combustion engine 102 and the turbocharger 108. In some embodiments, the exhaust conduit assembly 110 is disposed downstream of the turbocharger 108. For example, the exhaust may be provided from the turbocharger 108 to the exhaust conduit assembly 110 and subsequently to other downstream components of the exhaust aftertreatment system 100. As is explained in more detail herein, the exhaust conduit assembly 110 is configured to facilitate introduction of reductant (e.g., diesel exhaust fluid (DEF), Adblue®, a urea-water solution (UWS), an aqueous urea solution (e.g., AUS32, etc.), into the exhaust so as to facilitate treatment of the exhaust by the subsequent downstream components of the exhaust aftertreatment system 100. The exhaust conduit assembly 110 is also configured to facilitate cooling of a device (e.g., upstream dosing module 116, downstream dosing module 150, described in more detail herein), that is configured to inject the reductant into the exhaust.

The exhaust aftertreatment system 100 also includes a reductant delivery system 114. As is explained in more detail herein, the reductant delivery system 114 is configured to facilitate the introduction of a reductant (e.g., a reductant, a reductant air mixture, etc.) into the exhaust. The reductant delivery system 114 includes an upstream dosing module 116 (e.g., doser, dosing assembly, etc.). The upstream dosing module 116 is configured to facilitate passage of the reductant into the exhaust conduit assembly 110. As is explained in more detail herein, the upstream dosing module 116 is configured to receive reductant, and in some embodiments, configured to receive air and reductant, and provide the reductant and/or air-reductant mixture into the exhaust conduit assembly 110 to facilitate treatment of the exhaust. The upstream dosing module 116 may be coupled to the exhaust conduit assembly 110.

The upstream dosing module 116 includes an injector 118 (e.g., insertion device, etc.). The injector 118 is configured to dose (e.g., inject, insert, etc.) the reductant received by the upstream dosing module 116 into the exhaust within the exhaust conduit assembly 110.

The turbocharger 108 is heated by exhaust during operation of the exhaust aftertreatment system 100. In order to maximize the energy that can be harvested from the exhaust, it is often desirable to locate the turbocharger 108 as close to the internal combustion engine 102 as possible. Thus, the exhaust received by the turbocharger 108 is relatively hot. The heat from the turbocharger 108 may be transferred to the exhaust conduit assembly 110 and therefore to the upstream dosing module 116 which causes a temperature of the upstream dosing module 116 to increase. Thus, the exhaust conduit assembly 110 is configured to cool the upstream dosing module 116. Cooling the upstream dosing module 116 enables the upstream dosing module 116 to be disposed in higher temperature environments without being damaged by the higher temperatures.

The reductant delivery system 114 also includes a reductant source 120 (e.g., reductant tank, etc.). The reductant source 120 is configured to contain reductant. The reductant delivery system 114 also includes a reductant supply line 122. The reductant source 120 is configured to provide the reductant to the upstream dosing module 116 via the reductant supply line 122. The reductant source 120 may include multiple reductant sources 120 (e.g., multiple tanks connected in series or in parallel, etc.). The reductant source 120 may be, for example, a diesel exhaust fluid tank containing Adblue®. The reductant supplied to the upstream dosing module 116 and not injected into the exhaust conduit assembly 110 can be returned to the reductant source 120 via a reductant return line 124. The reductant from the reductant source 120 may be continuously circulated through the reductant supply and return lines 122, 124 to keep the reductant cool and/or to keep the reductant from freezing.

The reductant delivery system 114 also includes a reductant pump 126 (e.g., supply unit, etc.). The reductant pump 126 is configured to receive the reductant from the reductant source 120 and to provide the reductant to the upstream dosing module 116. For example, the reductant pump 126 is configured to provide the reductant to the injector 118. The reductant pump 126 is used to pressurize the reductant from the reductant source 120 for delivery to the upstream dosing module 116. In some embodiments, the reductant pump 126 is pressure controlled. In some embodiments, the reductant pump 126 is coupled to a chassis of a vehicle associated with the exhaust aftertreatment system 100.

In some embodiments, the reductant delivery system 114 also includes a reductant filter 128. The reductant filter 128 is configured to receive the reductant from the reductant source 120 and to provide the reductant to the reductant pump 126. The reductant filter 128 filters the reductant prior to the reductant being provided to internal components of the reductant pump 126. For example, the reductant filter 128 may inhibit or prevent the transmission of solids to the internal components of the reductant pump 126. In this way, the reductant filter 128 may facilitate prolonged desirable operation of the reductant pump 126.

In various embodiments, the reductant delivery system 114 also includes an air source 130 (e.g., air intake, etc.) and an air pump 132. The air pump 132 is configured to receive air from the air source 130. The air pump 132 is configured to provide the air to the upstream dosing module 116 via an air supply line 134. The upstream dosing module 116 is configured to mix the air and the reductant into an air-reductant mixture and to provide the air-reductant mixture to the injector 118 (e.g., for dosing into the exhaust within the exhaust conduit assembly 110, etc.). The injector 118 is configured to receive the air from the air pump 132. The injector 118 is configured to dose the air-reductant mixture into the exhaust within the exhaust conduit assembly 110. In some of these embodiments, the reductant delivery system 114 also includes an air filter 136. The air filter 136 is configured to receive the air from the air source 130 and to provide the air to the air pump 132. The air filter 136 is configured to filter the air prior to the air being provided to the air pump 132. In other embodiments, the reductant delivery system 114 does not include the air pump 132 and/or the reductant delivery system 114 does not include the air source 130. In such embodiments, the upstream dosing module 116 is not configured to mix the reductant with air.

The exhaust aftertreatment system 100 also includes a controller 138 (e.g., control circuit, driver, etc.). The controller 138 is configured control components of the reductant delivery system 114. For example, the upstream dosing module 116, the reductant pump 126, and the air pump 132 are electrically or communicatively coupled to the controller 138. The controller 138 is configured to control the upstream dosing module 116 to dose the reductant and/or the air-reductant mixture into the exhaust conduit assembly 110. The controller 138 may also be configured to control the reductant pump 126 and/or the air pump 132 in order to control the reductant and/or the air-reductant mixture that is dosed into the exhaust conduit assembly 110.

The controller 138 includes a processing circuit 140. The processing circuit 140 includes a processor 142. The processor 142 may include a microprocessor, an application-specific integrated circuit (ASIC), a field-programmable gate array (FPGA), etc., or combinations thereof. The processing circuit 140 also includes a memory 144. The memory 144 may include, but is not limited to, electronic, optical, magnetic, or any other storage or transmission device capable of providing a processor, ASIC, FPGA, etc. with program instructions. This memory 144 may include a memory chip, Electrically Erasable Programmable Read-Only Memory (EEPROM), Erasable Programmable Read Only Memory (EPROM), flash memory, or any other suitable memory from which the controller 138 can read instructions. The instructions may include code from any suitable programming language. The memory 144 may include various modules that include instructions which are configured to be implemented by the processor 142.

In various embodiments, the controller 138 is configured to communicate with a central controller 146 (e.g., engine control unit (ECU), engine control module (ECM), etc.) of an internal combustion engine having the exhaust aftertreatment system 100. In some embodiments, the central controller 146 and the controller 138 are integrated into a single controller.

In some embodiments, the central controller 146 is communicable with a display device (e.g., screen, monitor, touch screen, heads up display (HUD), indicator light, etc.). The display device may be configured to change state in response to receiving information from the central controller 146. For example, the display device may be configured to change between a static state and an alarm state based on a communication from the central controller 146. By changing state, the display device may provide an indication to a user of a status of the reductant delivery system 114.

In some embodiments, the exhaust aftertreatment system 100 also includes a particulate filter 148 (e.g., a diesel particulate filter (DPF)). The particulate filter 148 is configured to receive exhaust from an upstream exhaust conduit (e.g., exhaust conduit assembly 110). The particulate filter 148 is configured to remove particulate matter, such as soot, from exhaust flowing in the exhaust conduit system 104. The particulate filter 148 includes an inlet, where the exhaust is received, and an outlet, where the exhaust exits after having particulate matter substantially filtered from the exhaust and/or converting the particulate matter into carbon dioxide. In some implementations, the particulate filter 148 may be omitted. In various embodiments, the particulate filter 148 is coupled to the exhaust conduit assembly 110. In other embodiments, the particulate filter 148 is integrally formed with (e.g., unitarily formed with, formed as a one-piece construction with, inseparable from, etc.) the exhaust conduit assembly 110.

In some embodiments, the exhaust conduit assembly 110 extends from, or is coupled to, an outlet of the particulate filter 148. For example, an exhaust conduit assembly 110 may be disposed downstream from the particulate filter 148. In some embodiments, the exhaust conduit system 104 includes more than one exhaust conduit assembly 110. For example, a first exhaust conduit assembly 110 may be disposed upstream from the particulate filter 148 and a second exhaust conduit assembly 110 may be disposed downstream from the particulate filter 148.

With the exhaust conduit assembly 110 disposed downstream from the particulate filter 148, the reductant delivery system 114 of the exhaust aftertreatment system 100 may include a downstream dosing module 150. The downstream dosing module 150 may be similar to the upstream dosing module 116. For example, the downstream dosing module 150 receives reductant from the reductant source 120 (or a different reductant source) and may receive air from the air source 130 (or a different air source) to provide a reductant or a reductant mixture to the exhaust. As shown in FIG. 1, both the downstream dosing module 150 and the upstream dosing module 116 have a separate reductant supply line 122 extending from the reductant source 120 (or after the reductant pump 126) and a separate air supply line 134 extending from the air source 130 (or after the air pump 132).

The downstream dosing module 150 is also electrically or communicably coupled to the controller 138. The controller 138 is configured to control the downstream dosing module 150 to dose the reductant and/or the air-reductant mixture into the second exhaust conduit assembly 110. The controller 138 may also be configured to control the reductant pump 126 and/or the air pump 132 in order to control the reductant and/or the air-reductant mixture that is dosed into the second exhaust conduit assembly 110.

In various embodiments, the exhaust conduit system 104 of the exhaust aftertreatment system 100 further includes a decomposition chamber 152 (e.g., decomposition reactor, decomposition chamber, reactor pipe, decomposition tube, reactor tube, etc.). The decomposition chamber 152 is configured to receive exhaust from an exhaust conduit assembly 110 and/or another exhaust conduit of the exhaust conduit system 104 (e.g., after the reductant has been provided into the exhaust) and the reductant. For example, the decomposition chamber 152 may be coupled to the exhaust conduit assembly 110. In other embodiments, the decomposition chamber 152 is integrally formed with the exhaust conduit assembly 110.

The decomposition chamber 152 is configured to convert the reductant into ammonia. The reductant may be, for example, urea, diesel exhaust fluid (DEF), Adblue®, a urea water solution (UWS), an aqueous urea solution (e.g., AUS32, etc.), and/or other similar fluids. The decomposition chamber 152 includes an inlet that may be in fluid communication with the exhaust conduit assembly 110 to receive the exhaust containing $NO_x$ emissions and an outlet for the exhaust, $NO_x$ emissions, ammonia, and/or reductant to flow to a downstream component.

In various embodiments, the exhaust conduit system 104 includes a midstream exhaust conduit 154. The midstream exhaust conduit 154 is disposed downstream from the upstream exhaust conduit 106. The exhaust conduit system 104 may include more than one midstream exhaust conduit 154. The midstream exhaust conduit 154 may be configured to couple the decomposition chamber 152 to another component of the exhaust conduit system 104 that is downstream from the decomposition chamber. The midstream exhaust conduit 154 defines an exhaust flow path such that exhaust can flow from the decomposition chamber 152 to the downstream component. A midstream exhaust conduit 154 can be used to couple any components of the exhaust conduit system 104 together to provide a path for exhaust to flow between the components and through the exhaust conduit system. For example, if the exhaust aftertreatment system 100 does not include a downstream dosing module 150, a midstream exhaust conduit 154 may couple the particulate filter 148 to the decomposition chamber 152 rather than an exhaust conduit assembly 110.

In some embodiments, instead of a midstream exhaust conduit 154 coupling the decomposition chamber 152 to a downstream component, the exhaust conduit system 104 includes another exhaust conduit assembly 110 to couple the decomposition chamber 152 to the downstream component. For example, the exhaust aftertreatment system 100 may include another downstream dosing module 150 to be disposed between the decomposition chamber 152 and the downstream component. In such embodiments, an exhaust conduit assembly 110 may couple the decomposition chamber 152 to the downstream component and the downstream dosing module 150 can couple to the exhaust conduit assembly 110.

In various embodiments, the exhaust conduit system 104 of the exhaust aftertreatment system 100 includes a SCR catalyst member 156. The SCR catalyst member 156 is located downstream of the decomposition chamber 152 and configured to receive a mixture of the reductant and exhaust. The reductant droplets undergo the processes of evaporation, thermolysis, and hydrolysis to form non-$NO_x$ emissions (e.g., gaseous ammonia, etc.) within the exhaust conduit system 104.

The SCR catalyst member 156 includes an inlet in fluid communication with the decomposition chamber 152 from which exhaust and reductant are received and an outlet in fluid communication with a downstream component or an end of the exhaust conduit system 104. In various embodiments, the SCR catalyst member 156 is coupled to the decomposition chamber 152. In other embodiments, the SCR catalyst member 156 is integrally formed with the decomposition chamber 152. The SCR catalyst member 156 is located downstream of the decomposition chamber 152 and receives the exhaust from the decomposition chamber 152. In some embodiments, and the SCR catalyst member 156 is fluidly coupled with the decomposition chamber 152 via an exhaust conduit assembly 110 or some other exhaust conduit of the exhaust conduit system 104 (e.g., midstream exhaust conduit 154, described in more detail herein).

The SCR catalyst member 156 is configured to receive, treat, and output an exhaust output. For example, the SCR catalyst member 156 is configured to cause decomposition of components of the exhaust using the reductant (e.g., via catalytic reactions, etc.). Specifically, reductant that has been provided into the exhaust in the exhaust conduit assembly 110 undergoes the processes of evaporation, thermolysis, and hydrolysis to form non-$NO_x$ emissions within the decomposition chamber 152 and the SCR catalyst member 156. The SCR catalyst member 156 is configured to assist in the reduction of $NO_x$ emissions by accelerating a $NO_x$ reduction process between the reductant and the $NO_x$ of the exhaust into diatomic nitrogen, water, and/or carbon dioxide.

The exhaust aftertreatment system 100 also includes a downstream exhaust conduit 158 (e.g., line, pipe, etc.). The downstream exhaust conduit 158 is downstream from the midstream exhaust conduit 154. The downstream exhaust conduit 158 is downstream of the SCR catalyst member 156 and is configured to receive the exhaust from the SCR catalyst member 156. In some embodiments, the downstream exhaust conduit 158 is coupled to the SCR catalyst member 156. In other embodiments, the downstream exhaust conduit 158 is integrally formed with the SCR catalyst member 156.

FIG. 2 illustrates another embodiment of the exhaust aftertreatment system 100. In such embodiment, both the upstream dosing module 116 and the downstream dosing module 150 receive reductant from the reductant source 120. The reductant pump 126 initially provides the reductant to the upstream dosing module 116 via the reductant supply line 122, then the reductant supply line 122 extends from the upstream dosing module 116 to the downstream dosing module 150 such that the reductant travels from the upstream dosing module 116 to the downstream dosing module 150. The reductant return line 124 receives the reductant from the downstream dosing module 150 and returns the reductant to the reductant source 120.

Both the upstream dosing module 116 and the downstream dosing module 150 receive air from the air source 130. The air pump 132 initially provides the air to the upstream dosing module 116 via the air supply line 134, then the air supply line 134 extends from the upstream dosing module 116 to the downstream dosing module 150 such that the air travels from the upstream dosing module 116 to the downstream dosing module 150. The air may be released from the downstream dosing module 150 or the reductant delivery system 114 may include an air return line to return the air to the air source 130.

While the exhaust aftertreatment system 100 has been shown and described in the context of use with a diesel internal combustion engine, it is understood that the exhaust aftertreatment system 100 may be used with other internal combustion engines, such as gasoline internal combustion engines, hybrid internal combustion engines, propane internal combustion engines, dual-fuel internal combustion engines, and other similar internal combustion engines.

While the reductant delivery system 114 has been shown and described in the context of use with a reductant, it is understood that the reductant delivery system 114 may be used instead with a hydrocarbon fluid (e.g., fuel, lubricant, oil, etc.). In these embodiments, an igniter (e.g., spark plug, etc.) may be positioned downstream of the upstream dosing module 116 and utilized to ignite the hydrocarbon fluid. This ignition causes an increase in temperature of the exhaust downstream of the upstream dosing module 116, which may be utilized to regenerate the SCR catalyst member 156.

III. Example Exhaust Conduit Assemblies

Figure 3:
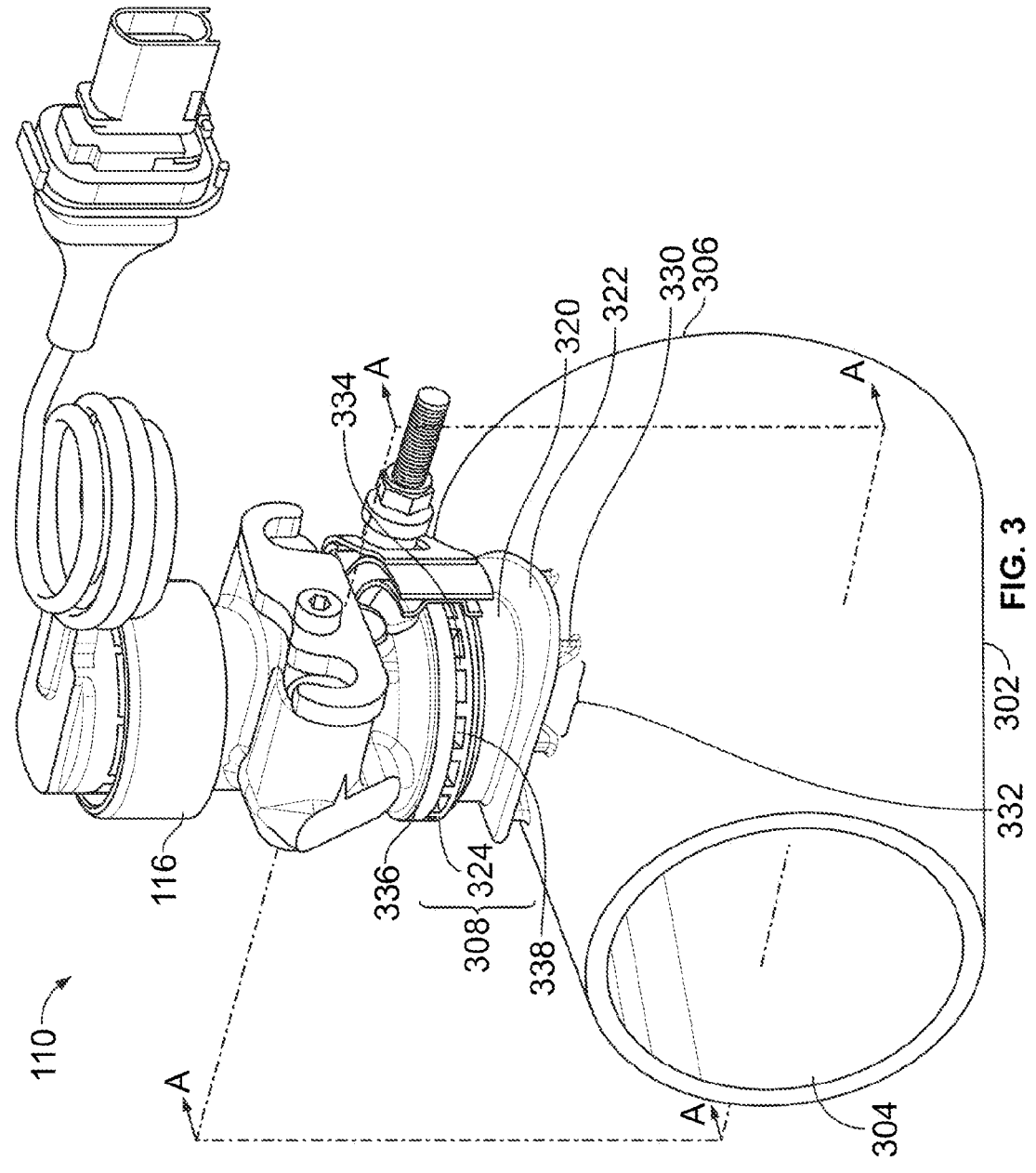
FIG. 3 is a perspective view of an example exhaust conduit assembly for an exhaust aftertreatment system.
Figure 4:
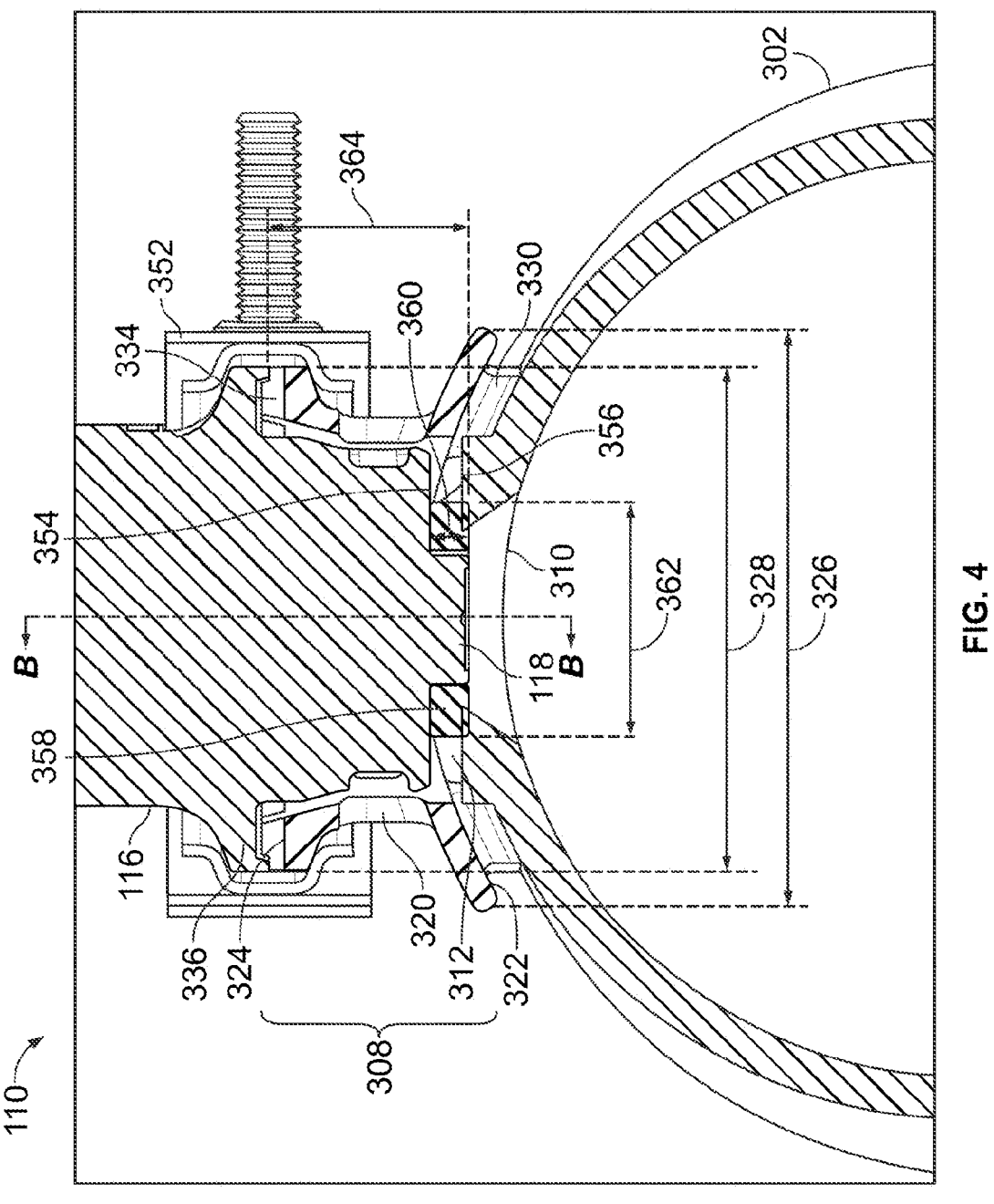
FIG. 4 is a cross-sectional view of the exhaust conduit assembly shown in FIG. 3 taken along plane A-A in FIG. 3.
Figure 5:
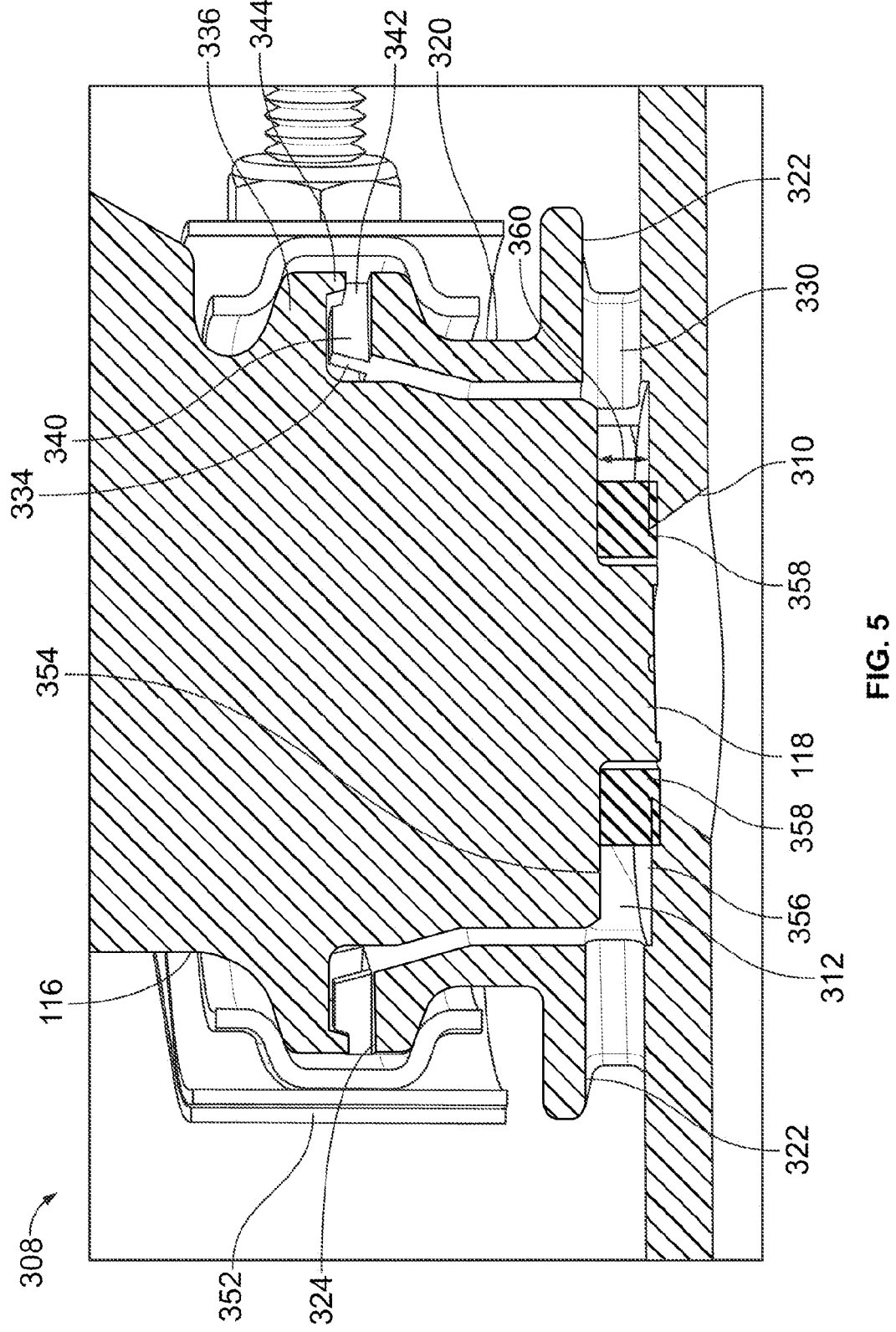
FIG. 5 is a cross-sectional view of the exhaust conduit assembly shown in FIG. 4 taken along plane B-B in FIG. 4.

FIGS. 3-5 illustrate the exhaust conduit assembly 110 according to an exemplary embodiment. The exhaust conduit assembly 110 includes an exhaust conduit body 302. The exhaust conduit body 302 defines an exhaust flow path. For example, the exhaust conduit body 302 includes an inlet 304. The inlet 304 can be configured to receive exhaust from an upstream component (e.g., the turbocharger 108). The exhaust conduit body 302 also includes an outlet 306. A downstream component (e.g., the particulate filter 148) can be configured to receive the exhaust from the outlet 306 such that the exhaust flows from the inlet 304 through the exhaust conduit body 302 to the outlet 306. In some embodiments, the area of the inlet 304 is the same as the area of the outlet 306 (e.g., the exhaust conduit body 302 has a constant cross-sectional area from the inlet 304 to the outlet 306). In some embodiments, the area of the inlet 304 is different than the area of the outlet 306. For example, the area of the inlet 304 may be smaller than the area of the outlet 306. The area of the inlet 304 may also be larger than the area of the outlet 306. The exhaust conduit body 302 may be a straight conduit, an offset conduit, or any other shape of conduit. The exhaust conduit body 302 may be made of 316L or 439L stainless steel, for example. The exhaust conduit body 302 may be deep drawn sheet metal or turned, for example.

In some embodiments, the exhaust conduit assembly 110 includes a doser mount 308. The doser mount 308 may be coupled to the exhaust conduit body 302. For example, the exhaust conduit assembly 110 may be a two or three piece combination with the doser mount 308 fastened, welded, riveted, or otherwise attached to the exhaust conduit body 302. In some embodiments, the doser mount 308 is integrally formed with the exhaust conduit body 302. For example, the doser mount 308 and the exhaust conduit body 302 form a single component. The doser mount 308 and the exhaust conduit body 302 may be directly casted or 3D printed as one part. The doser mount 308 may be made of stainless steel (e.g., 316L or 439L) when integral with the exhaust conduit body 302. The doser mount 308 may include other materials (e.g., more insulating materials) if not integral with the exhaust conduit body 302.

The doser mount 308 facilitates injection of a reductant into the exhaust conduit body 302 for treatment of an exhaust. For example, the exhaust conduit assembly 110 includes an injection aperture 310. The injection aperture 310 extends through the exhaust conduit body 302. The injection aperture 310 provides a path for reductant to enter the exhaust conduit body 302. The injection aperture 310 may have a conical shape. For example, an inlet of the injection aperture 310 may have a smaller area than an outlet of the injection aperture 310. The doser mount 308 is configured to receive, at least a portion, of a dosing module 116, 150, such that an injector 118 of the dosing module 116, 150 is aligned with the injection aperture 310 and can inject reductant into the exhaust within the exhaust conduit body 302.

The doser mount 308 includes an annular body portion 320. The annular body portion 320 may have a circular or round shape configured to surround a component. For example, the annular body portion 320 defines a central cavity 312. The central cavity 312 extends around the injection aperture 310. The central cavity 312 is configured to receive at least a portion of a dosing module 116, 150. The shape of the annular body portion may be, at least partially configured to have a corresponding shape to the dosing module 116, 150. For example, the dosing module 116, 150 may have a generally circular shape. The annular body portion 320 may have a similar circular shape that surrounds the dosing module 116, 150. The annular body portion 320 may be configured such that the dosing module 116, 150 can be disposed in the central cavity 312 without contacting (e.g., disposed away from) an inner wall of the annular body portion 320. The annular body portion 320 can provide support for the doser mount 308 and protection or support for the dosing module 116, 150 while reducing an overall size of the doser mount 308. Limiting contact points between the annular body portion 320 and the dosing module 116, 150 may reduce the paths for heat to transfer from the doser mount 308 to the dosing module 116, 150.

The annular body portion 320 has a lower surface 322 and an upper surface 324. The lower surface 322 is disposed closer to the exhaust conduit body 302 than the upper surface 324. The lower surface 322 extends radially outward from the annular body portion 320. The lower surface 322 may extend around an entire circumference of the annular body portion 320. The lower surface 322 has an outer diameter, shown as lower surface diameter 326. The lower surface diameter 326 may be within a range from 50 mm-60 mm, for example. The size of the lower surface diameter 326 may be based on different applications, force loads, vibrations, thermal analysis, or manufacturing needs, among others.

The upper surface 324 extends radially outward from the annular body portion 320 (e.g., away from the central cavity 312). The upper surface 324 may extend around an entire circumference of the annular body portion 320. The upper surface 324 has an outer diameter, shown as upper surface diameter 328. The upper surface diameter 328 may be within a range from 43 mm-53 mm, for example. The size of the upper surface diameter 328 may be based on different applications, forces, loads, vibrations, thermal analysis, or manufacturing needs, among others.

The doser mount 308 includes a plurality of legs 330. Each of the legs 330 protrude from the lower surface 322. The legs 330 may be configured to be coupled to an outer surface of the exhaust conduit body 302. In some embodiments, the legs 330 are integral with the exhaust conduit body 302. For example, the annular body portion 320, the legs 330, and the exhaust conduit body 302 may be formed as a single monolithic structure. The legs 330 may cooperate with the exhaust conduit body 302 to define a plurality of lower channels. For example, the legs 330 can extend away from the lower surface 322 toward the exhaust conduit body 302 and define a space between the lower surface 322 and the exhaust conduit body 302. The space can be the lower channels 332. The lower channels 332 are between the lower surface 322 and the exhaust conduit body 302. The legs 330 extend from the lower surface 322 at a plurality of circumferential positions of the lower surface 322. The legs 330 extend radially between the central cavity 312 and an exterior (e.g., outer edge or perimeter) of the lower surface 322 of the annular body portion 320. For example, the legs 330 can extend from the central cavity 312 to a distance that is equal to or less than the lower surface diameter 326.

The legs 330 can provide distinct paths for heat to travel when transferring from the exhaust conduit body 302 to other components of the doser mount 308. For example, instead of an entire circumference of the annular body portion 320 directly contacting the exhaust conduit body 302, only discrete portions (e.g., each of the legs 330) contact the exhaust conduit body 302, which reduces the surface area for heat to transfer through. This may reduce the amount of heat transferred to the doser mount 308, and ultimately to the upstream dosing module 116. The lower channels 332 defined, at least partially, by the legs 330, define pathways for air to contact more surface area of the doser mount 308 and to enter the central cavity 312 of the doser mount 308 to contact the upstream dosing module 116. Increasing the air movement around the upstream dosing module 116 and the doser mount 308 may increase the amount of heat that can be removed from the doser mount 308 and the upstream dosing module 116. Instead, the heat can be released into the air.

The doser mount 308 includes a plurality of projections 334. The projections 334 extend from the upper surface 324 at a plurality of circumferential positions of the upper surface 324. The projections 334 extend radially between the central cavity 312 and an exterior (e.g., outer edge or perimeter) of the upper surface 324 of the annular body portion 320. For example, the projections 334 extend radially from the central cavity 312 to a distance equal to or less than the upper surface diameter 328. In some embodiments, the annular body portion 320, the legs 330, and the projections 334 are formed as a single monolithic structure. The projections 334 may be configured to interface (e.g., contact, rest on, etc.) with a dosing module 116, 150. For example, the upstream dosing module 116 may include a flange 336. The flange 336 may extend radially around the upstream dosing module 116. The flange 336 may be configured to interface with the projections 334 when a portion of the upstream dosing module 116 is disposed in the central cavity 312. The projections 334 may facilitate proper placement of the upstream dosing module 116. For example, the interfacing between the flange 336 and the projections 334 may force the upstream dosing module 116 to be centered within the central cavity 312 of the doser mount 308. The interfacing between the flange 336 and the projections 334 may also be configured to resist external forces (e.g., vibration load).

The projections 334 define a plurality of upper channels 338. For example, the projections 334 may cooperate with the upstream dosing module 116 to define the upper channels 338 between the upper surface 324 of the doser mount 308 and the flange 336 of the upstream dosing module 116. There is space between each of the projections. The flange 336 may have a planar contact surface that is configured to interface with a top of the projections 334. The flange 336, or any part thereof, may not be disposed in the space between the projections 334. The space between the projections may be the upper channels 338. The upper channels 338 may extend from a perimeter of the upper surface 324 (e.g., exterior to the doser mount 308) to the central cavity 312 of the doser mount 308. The upper surface 324 can have any number of projections 334. The projections 334 may be disposed around the central cavity 312 of the doser mount 308. The projections 334 may be spaced evenly such that the upper channels 338 are the same size. In some embodiments, the projections are not spaced evenly and the upper channels 338 have different sizes. The upper channels 338 provide paths for air to enter the central cavity 312. Increased airflow within the central cavity 312 may cause more heat to dissipate into the air away from the upstream dosing module 116 and the doser mount 308.

The projections 334 are configured to reduce heat transferred to the upstream dosing module 116 and to remove heat from the upstream dosing module 116. For example, the projections 334 reduce the overall area of contact between the doser mount 308 and the upstream dosing module 116. For example, instead of the flange 336 contacting the entire upper surface 324 of the doser mount 308, the flange 336 only contacts the projections 334. The surface area of the projections 334 is smaller than the surface area of the upper surface 324. The projections 334 also provide distinct paths for the heat to travel through when transferring between components. For example, instead of the heat conductively transferring from any location of the upper surface 324, the heat may only conductively transfer through the projections 334. The heat travels within the upper surface 324 to a projection 334 before transferring to the upstream dosing module 116, which increases the length of travel for the heat, which may delay heat transfer to the upstream dosing module 116 and provide more time for the heat to dissipate into the surrounding air.

Both the legs 330 and the projections 334 are configured to reduce the amount of heat transferred from the exhaust conduit body 302 to the upstream dosing module 116. A leg 330 defines a first route for the heat to travel via conduction. The first route is between the exhaust conduit body 302 and the doser mount 308. A projection 334 defines a second route for the heat to travel via conduction. The second route is between the doser mount 308 and the upstream dosing module 116. The legs 330 define the lower channels 332, which facilitate introduction of outside air into the central cavity 312 at a bottom of the central cavity 312. The projections 334 define the upper channels 338, which facilitate introduction of outside air into the central cavity 312 at a top of the central cavity 312. The lower channels 332 and the upper channels 338 define openings for the outside air to enter the central cavity 312. The number of projections 334 may be the same or different than the number of legs 330. The legs 330 are structural components of the doser mount 308 configured to support the annular body portion 320, the upper surface 324, and the projections 334. The projections

334 are also structural components of the doser mount 308, but are configured to support the upstream dosing module 116 by contacting the flange 336 and facilitate proper placement of the upstream dosing module 116.

Figures 6, 7:
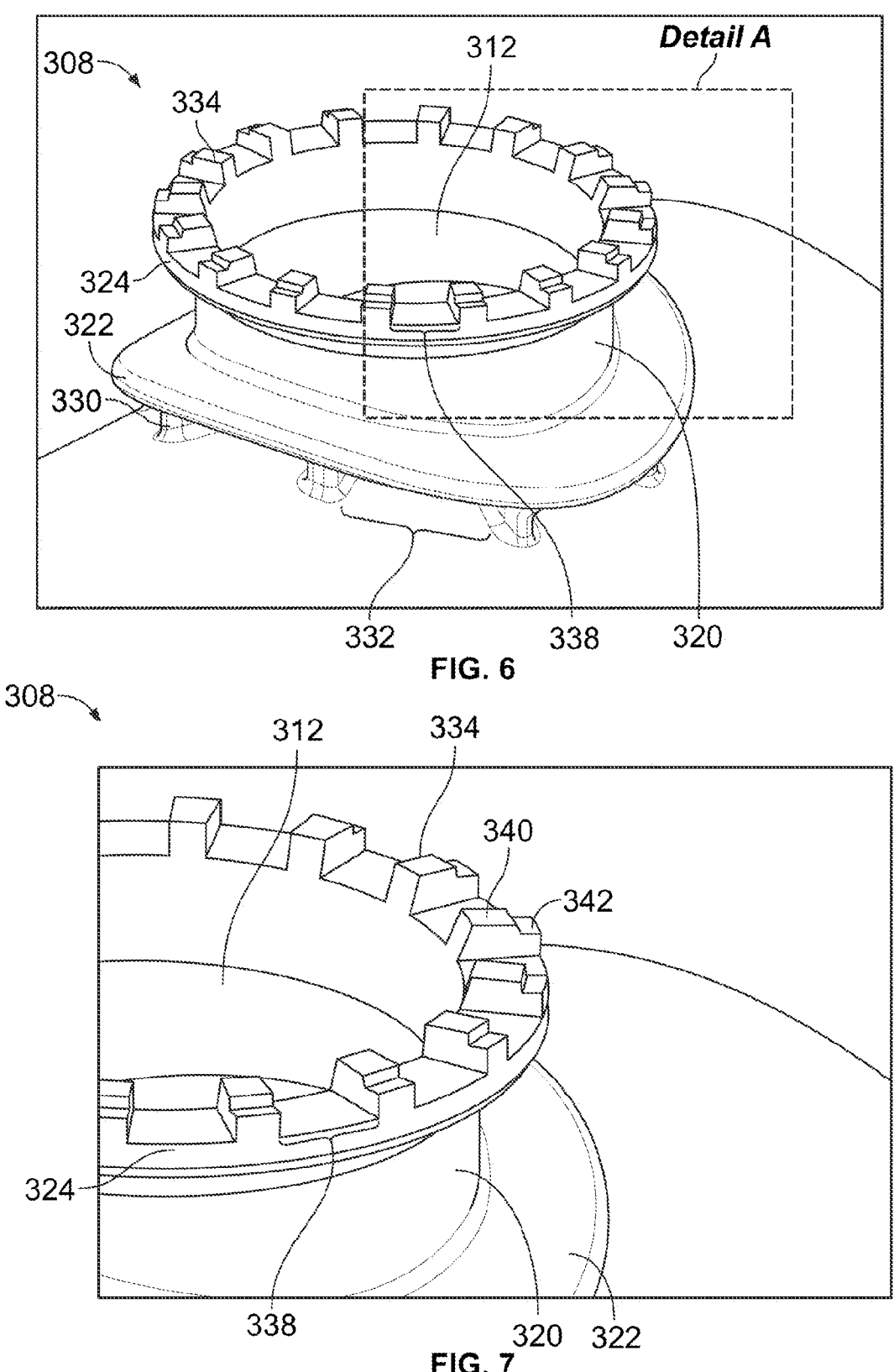
FIG. 6 is a perspective view of an example doser mount for an exhaust aftertreatment system.
FIG. 7 is a detailed view of DETAIL A shown in FIG. 6.

FIGS. 6-7 illustrate the doser mount 308, or portions thereof, according to an exemplary embodiment. The projections 334 of the doser mount 308 may have an inner portion 340 and an outer portion 342. The inner portion 340 is closer to the central cavity 312 than the outer portion 342. The inner portion 340 may define a portion of the central cavity 312. The inner portion 340 may extend further away from the upper surface 324 than the outer portion 342. For example, the projections 334 may have a step configuration in which the outer portion 342 extends radially a first distance along the upper surface 324 and then the projections 334 step up to the inner portion 340 that extends radially a second distance along the upper surface 324. The first distance may be less than the second distance. The inner portion 340 may extend further away from the upper surface 324 than the outer portion 342.

The flange 336 of the upstream dosing module 116 may be configured to interface with both the inner portion 340 and the outer portion 342 of a projection 334. In some embodiments, the flange 336 only interfaces with one portion of the projection 334. For example, the flange 336 may include a tip 344 that extends axially (e.g., down, toward the doser mount 308) from the flange 336. The tip 344 may extend around the circumference of the flange 336. The tip 344 may be configured to interface with the outer portion 342 of the projections 334. The outer portion 342 may support the tip 344 such that a portion of the flange 336 is disposed above the inner portion 340 of the projections 334, but does not contact the inner portion 340. For example, a space is maintained between the inner portion 340 and the flange 336. This reduces direct contact between components which can reduce heat transfer. This also provides more paths for air to enter and remove heat from the upstream dosing module 116 and the doser mount 308.

Figures 8A, 8B:
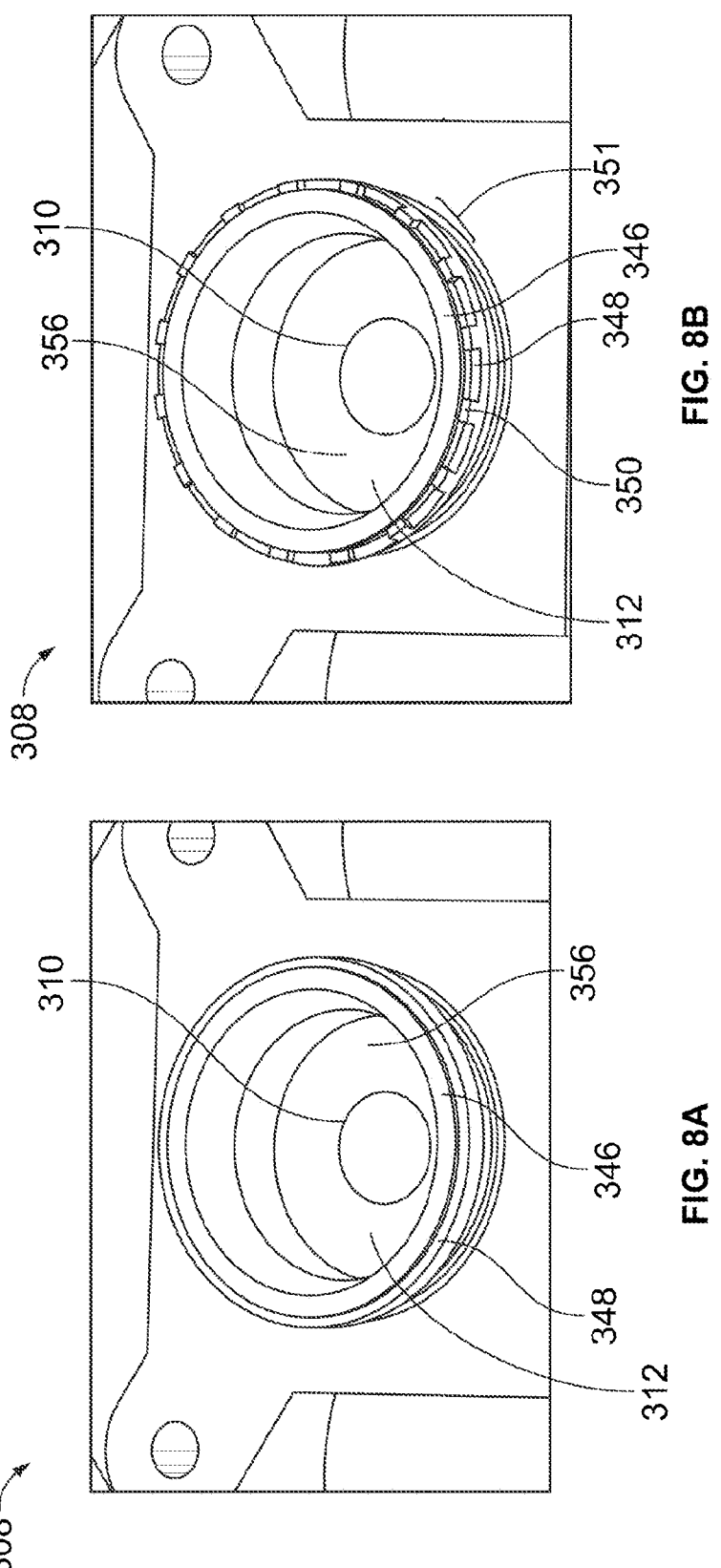
FIG. 8A is a top perspective view of another example doser mount for an exhaust aftertreatment system.
FIG. 8B is a top perspective view of another example doser mount for an exhaust aftertreatment system.

FIGS. 8A-8B illustrate the doser mount 308 according to various exemplary embodiments. Instead of the projections 334, the doser mount 308 may include an inner rim 346. The inner rim 346 may define a portion of the central cavity 312. The inner rim 346 may extend away from the upper surface 324 such that the inner rim 346 and the upper surface 324 have a step configuration. For example, the inner rim 346 may extend radially from the central cavity 312 toward an outer edge of the upper surface 324, but only extend a portion of a distance of the upper surface 324 such that an outer portion 348 of the upper surface 324 remains exposed. The outer portion 348 of the upper surface 324 that is exposed may be lower than a top surface of the inner rim 346. The outer portion 348 of the upper surface 324 may provide a continuous contact surface to interface with the tip 344 of the flange 336.

In some embodiments, the doser mount 308 includes a plurality of ribs 350. The ribs 350 extend from the outer portion 348 of the upper surface 324. The ribs 350 may also extend from a side of the inner rim 346. A top surface of the ribs 350 may be disposed below the top surface of the inner rim 346. The ribs 350 may provide a non-continuous contact surface to interface with the tip 344 of the flange 336. For example, while the upper surface 324 provides a surface that extends continuously around the inner rim 346, the ribs 350 provide distinct, individual surfaces that are disposed around the inner rim 346 and separated from each other. The ribs 350 reduce the area of contact between the flange 336 and the doser mount 308. For example, the flange 336 only contacts the individual surfaces of the ribs 350, not the whole outer portion 348 of the upper surface 324. The outer portion 348 may provide a contact surface of over 180 mm². A sum of the surfaces of the ribs 350 may provide an aggregate contact surface of less than 60 mm². The reduced contact area may reduce the amount of heat transferred via conduction between the doser mount 308 and the upstream dosing module 116. The ribs 350 may also define pockets 351. The pockets 351 are defined by a space between two adjacent ribs 350 and between the upper surface 324 and the tip 344 of the flange 336. The pockets 351 allow for air to contact more surface area of the doser mount 308 to convectively draw more heat away from the doser mount 308 to prevent the heat from passing to the upstream dosing module 116.

The upstream dosing module 116 may be coupled to the doser mount 308. For example, upstream dosing module 116 may be coupled to the doser mount 308 such that an injector 118 of the upstream dosing module 116 may be received within the central cavity 312 of the doser mount 308. The upstream dosing module 116 may be coupled to the doser mount 308 via a clamp 352 (e.g., v-band clamp, a collar, etc.). For example, the upper surface 324 and the flange 336 of the upstream dosing module 116 may be clamped together via the clamp 352. When the upstream dosing module 116 is coupled with the doser mount 308, a face 354 of the upstream dosing module 116 may interface directly or indirectly with a base 356 of the doser mount 308. The base 356 may be defined by an exterior surface of the exhaust conduit body 302. For example, an insulator 358 may be disposed between the face 354 of the upstream dosing module 116 and the base 356. The insulator 358 may be configured to surround at least a portion of the upstream dosing module 116 (e.g., the injector 118, a nozzle).

The insulator 358 facilitates further reduction of heat transfer from the exhaust to the upstream dosing module 116. For example, the insulator 358 may prevent the upstream dosing module 116 from directly contacting a hot exhaust conduit body 302. A thickness of the insulator 358 may vary to provide more or less insulation (e.g., a thicker insulator 358 may provide more insulation). The insulator 358 may also provide a seal between the exhaust conduit body 302 and the central cavity 312 of the doser mount 308. The seal can prevent exhaust from within the exhaust conduit body 302 from flowing into the central cavity 312 and directly contacting the upstream dosing module 116. The insulator 358 may have a thickness 360. The thickness 360 may vary. For example, a larger thickness 360 can reduce heat transfer from the exhaust conduit body 302 to the upstream dosing module 116. The thickness 360 may be, for example, within a range of 3 mm-4 mm. The insulator 358 may also have a sealing diameter 362. The sealing diameter 362 may be, for example, within a range of 17 mm-27 mm.

A mount height 364 may define a distance between the base 356 and the contact surface between the flange 336 and the projections 334 (e.g., the outer portion 342 of the projections 334). The mount height 364 may be, for example, within a range of 17.5 mm-18.5 mm. The mount height 364 may be based on different applications, force loads, vibrations, thermal analysis, or manufacturing needs, among others.

Figure 9:
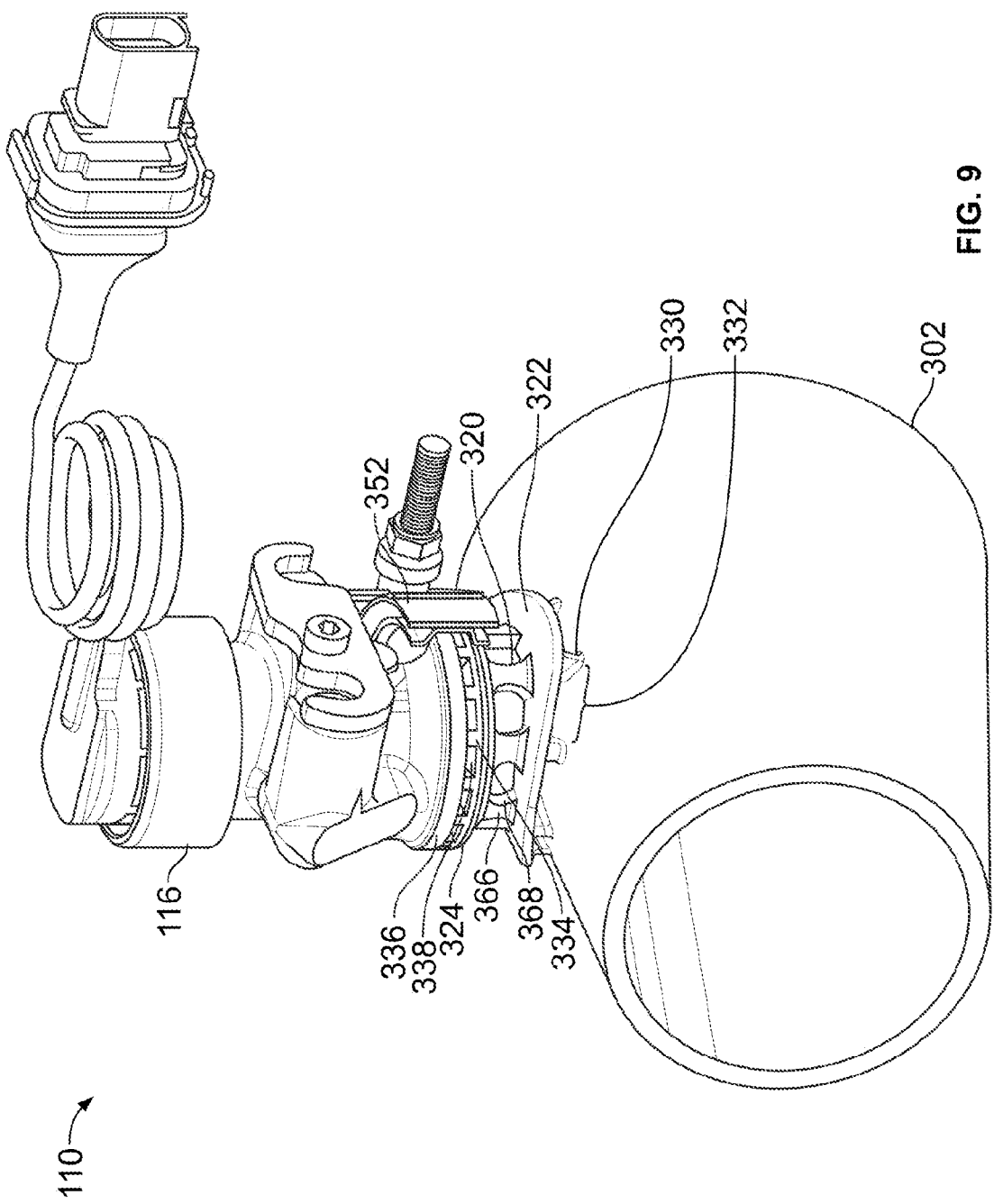
FIG. 9 is a perspective view of another example exhaust conduit assembly for an exhaust aftertreatment system.
Figure 10:
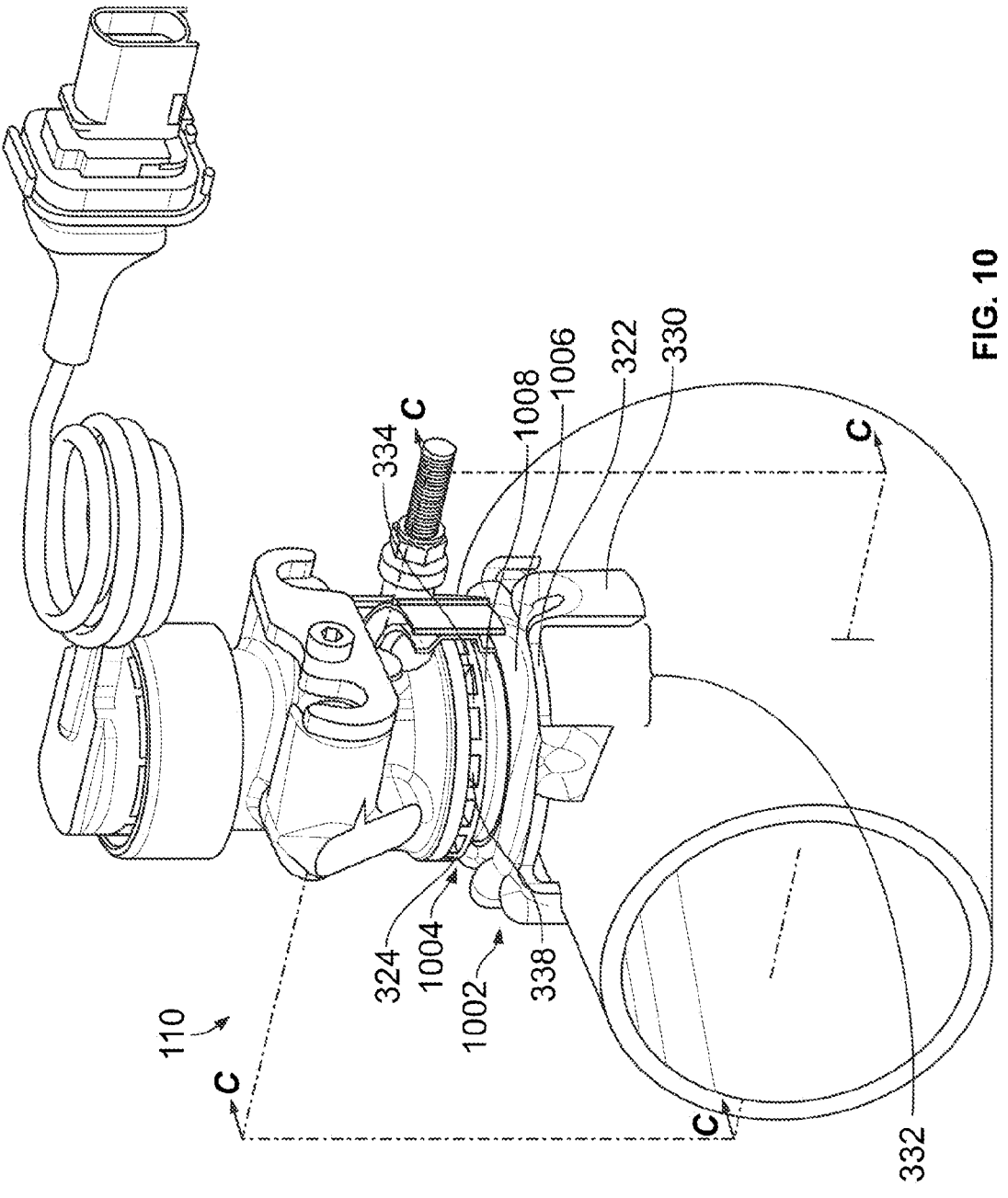
FIG. 10 is a perspective view of another example exhaust conduit assembly for an exhaust aftertreatment system.
Figure 11:
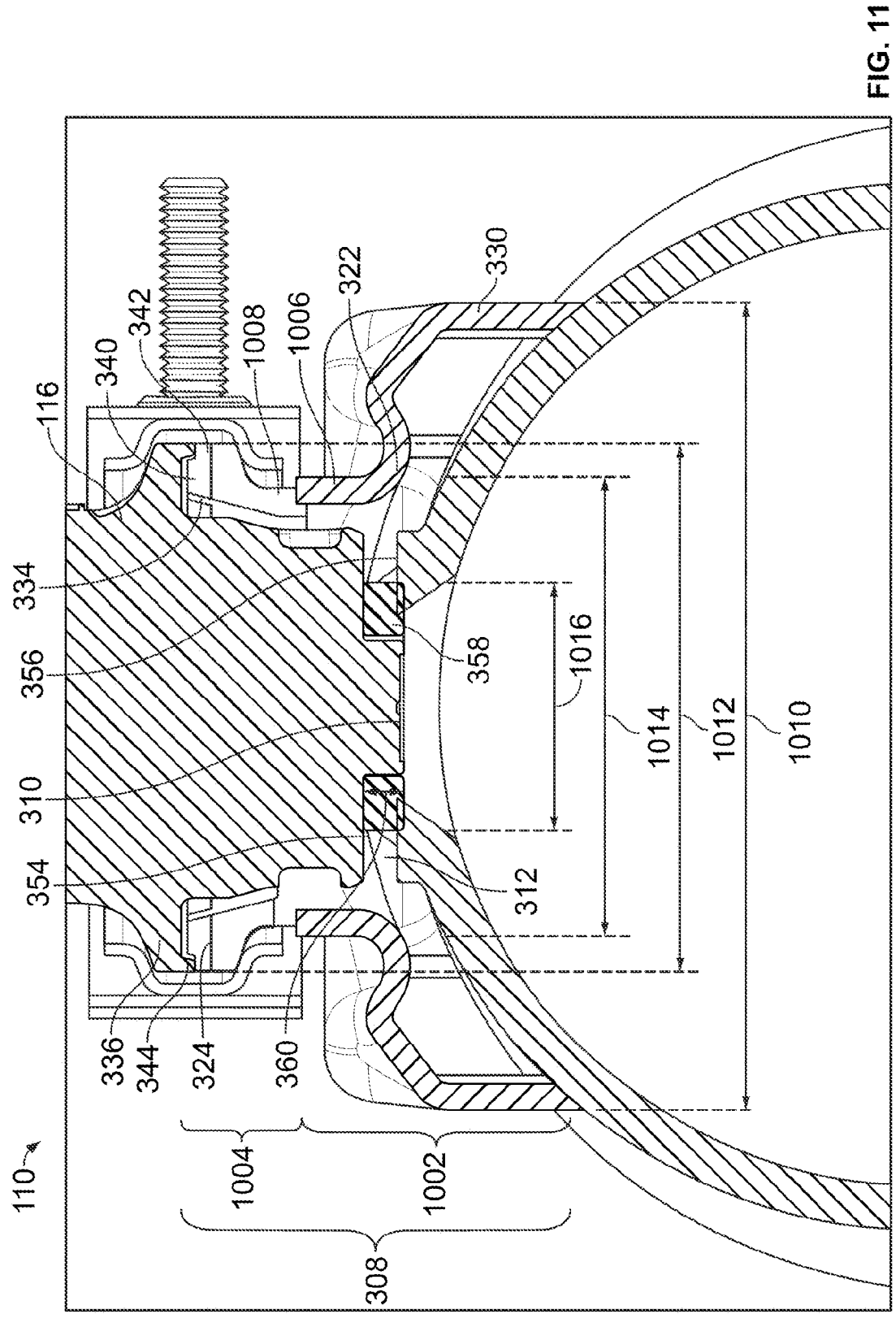
FIG. 11 is a cross-sectional view of the exhaust conduit assembly shown in FIG. 10 taken along plane C-C in FIG. 10.

FIG. 9 illustrates the exhaust conduit assembly 110 according to an exemplary embodiment. The annular body portion 320 of the doser mount 308 may include a plurality of body ribs 366. For example, instead of a solid annular body portion 320, the body ribs 366 extend between the lower surface 322 and the upper surface 324 and define a plurality of central channels 368 that are paths for air to enter the central cavity 312. The body ribs 366 and central channels 368 may reduce heat transferred to the upstream dosing module 116 by limiting the paths by which the heat can travel (e.g., only via the body ribs 366) and allowing for additional cooling of the doser mount 308 and the upstream dosing module 116 via increased air flow.

FIGS. 10-15 illustrate the exhaust conduit assembly 110 according to various embodiments. In some embodiments, the doser mount 308 includes a first member 1002 and a second member 1004. The first member 1002 may be a deep drawn sheet metal part with reinforcing ribs and the second member 1004 may be a turned part, for example. The first member 1002 may be attached to the second member 1004. For example, the first member 1002 may be welded to the second member 1004.

The first member 1002 includes a lower portion 1006 of the annular body portion 320 and the plurality of legs 330. The lower portion 1006 may define at least a portion of the central cavity 312 of the doser mount 308. In some embodiments, the lower portion 1006 may have a lower surface 322 and the legs 330 may extend from the lower surface 322 of the lower portion 1006. In some embodiments, the lower portion 1006 may form a continuous member with the legs 330. The legs 330 may extend in any direction from the lower portion 1006. For example, the legs 330 may have a non-linear shape or orientation to create an indirect path (e.g., not straight, non-linear) between the lower portion 1006 and the exhaust conduit body 302 to create a longer path for heat to travel from the exhaust conduit body 302 to the lower portion 1006 of the annular body portion 320. For example, the legs 330 may begin from a bottom (e.g., a lower surface 322) of the lower portion 1006 and extend upward (e.g., away from the exhaust conduit body 302) to a point above where the legs 330 begin. The legs may then extend back toward the exhaust conduit body 302 to couple with the exhaust conduit body 302. The longer legs may allow for more heat to be dissipated into the surrounding air before reaching the second member 1004 and the upstream dosing module 116, which may reduce the heat transferred from the exhaust conduit body 302 to the doser mount 308, and ultimately the upstream dosing module 116.

The legs 330 may also provide support for the lower portion 1006 such the lower portion 1006 is disposed away from, and does not contact, the exhaust conduit body 302. For example, the only portion of the first member 1002 (and the whole doser mount 308) that contacts the exhaust conduit body 302 is an end of the legs 330. The longer legs 330 may also create more room for air to move around the legs 330 and into the central cavity 312. The more air flow may also increase the amount of heat taken away from the doser mount 308 and the upstream dosing module 116. The legs 330 may have a thin profile to reduce the contact area between the legs 330 and the exhaust conduit body 302. The thinner profile may further reduce the heat transferred from the exhaust conduit body 302 to the doser mount 308 and the upstream dosing module 116. The legs 330 may define a restricted heat flux path.

The second member 1004 includes an upper portion 1008 of the annular body portion 320 and the plurality of projections 334. The upper portion 1008 may define at least a portion of the central cavity 312 of the doser mount 308. The upper portion 1008 may have an upper surface 324 and the projections 334 may extend form the upper surface 324. The upper portion 1008 may be configured to contact and support the upstream dosing module 116. For example, the projections 334 can interface with the flange 336 of the upstream dosing module 116. In some embodiments, the projections have an inner portion 340 and an outer portion 342. The flange 336 may have a tip 344 configured to contact a top surface of the outer portion 342 and not a top surface of the inner portion 340.

The upper portion 1008 and the lower portion 1006 of the annular body portion 320 may be the same size. For example, the annular body portion 320 is divided into two equal portions. In some embodiments, the annular body portion 320 is not divided evenly, and the upper portion 1008 and the lower portion 1006 are different sizes.

Figure 14:
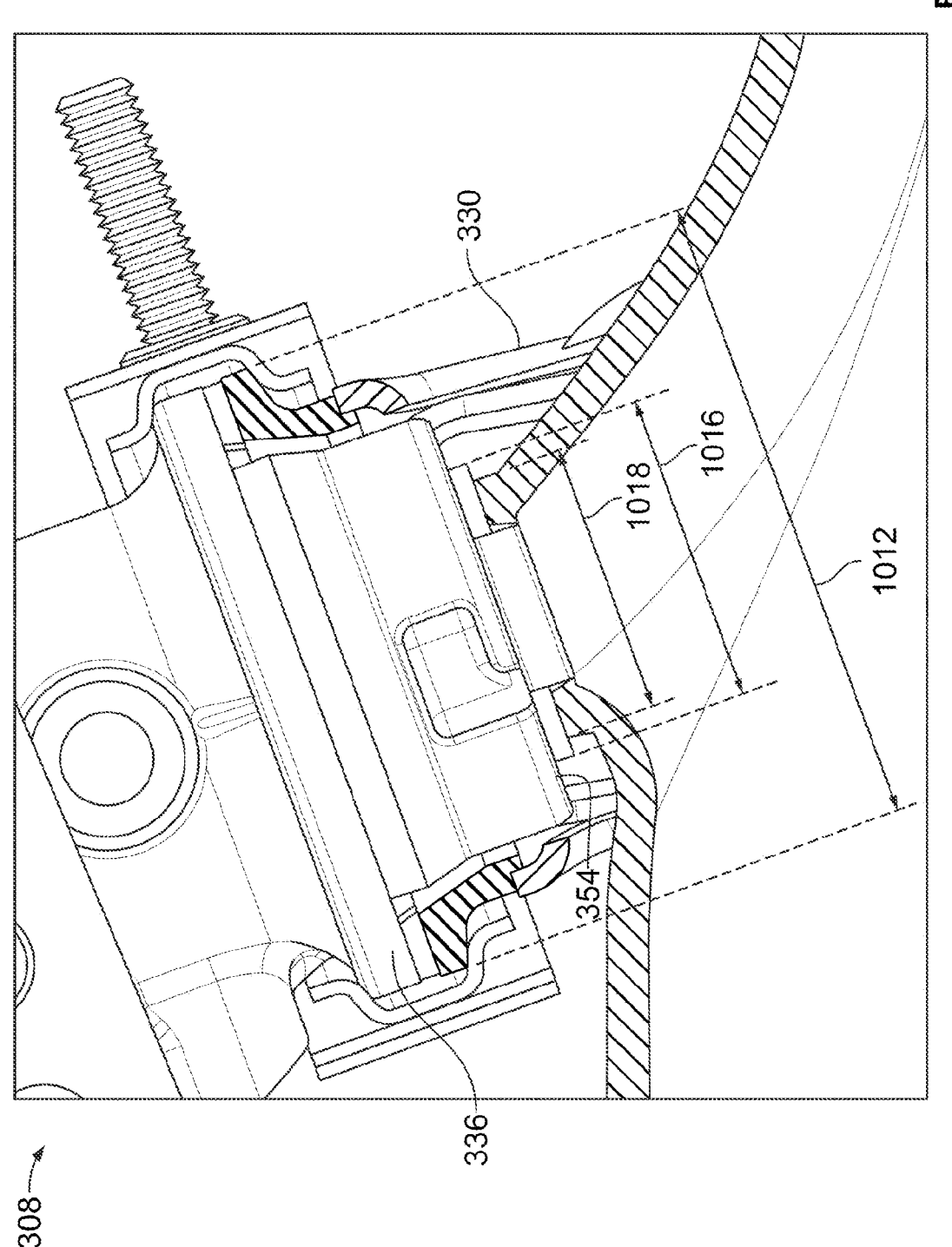
FIG. 14 is a detailed view of DETAIL B shown in FIG. 13A.

A doser mount 308 with a first member 1002 and a second member 1004 may have a lower portion diameter 1010. The lower portion diameter 1010 may be, for example, within a range of 67 mm-77 mm. The doser mount 308 may have an upper portion diameter 1012. The upper portion diameter 1012 may be, for example, within a range of 40 mm-50 mm. The doser mount 308 may have a central portion diameter 1014. The central portion diameter 1014 may be, for example, within a range of 35 mm-45 mm. The doser mount 308 may have a sealing diameter 1016. The sealing diameter 1016 may be, for example, within a range of 17 mm-27 mm. The doser mount 308 may have base diameter 1018. The base diameter 1018 may be, for example, within a range of 15 mm-25 mm. In some embodiments, the base diameter 1018 is larger than the sealing diameter 1016, as shown in FIG. 4. In some embodiments, the base diameter 1018 is smaller than the sealing diameter 1016, as shown in FIG. 14.

Figure 12:
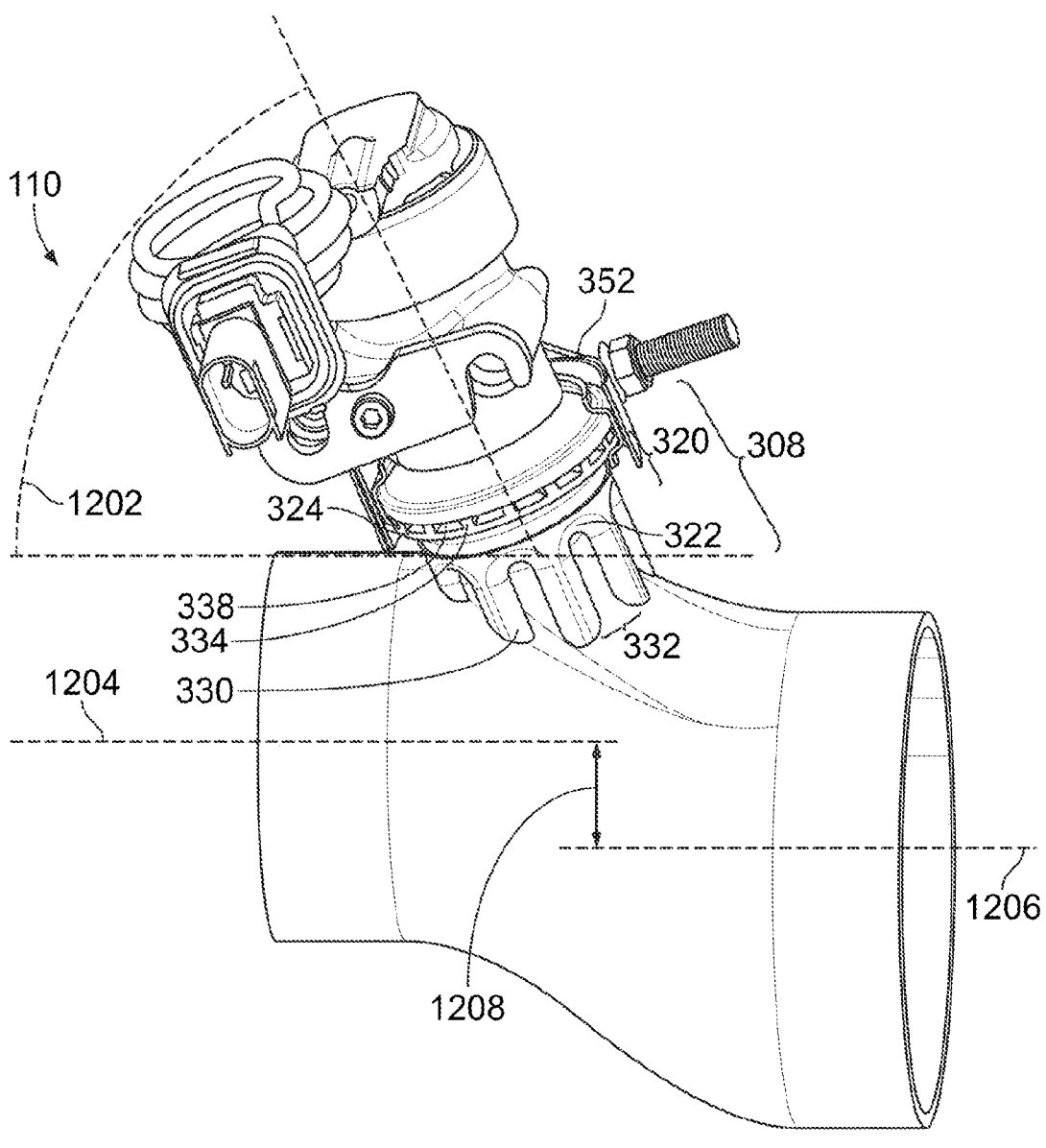
FIG. 12 is a side view of another exhaust conduit assembly for an exhaust aftertreatment system.
Figure 13A:
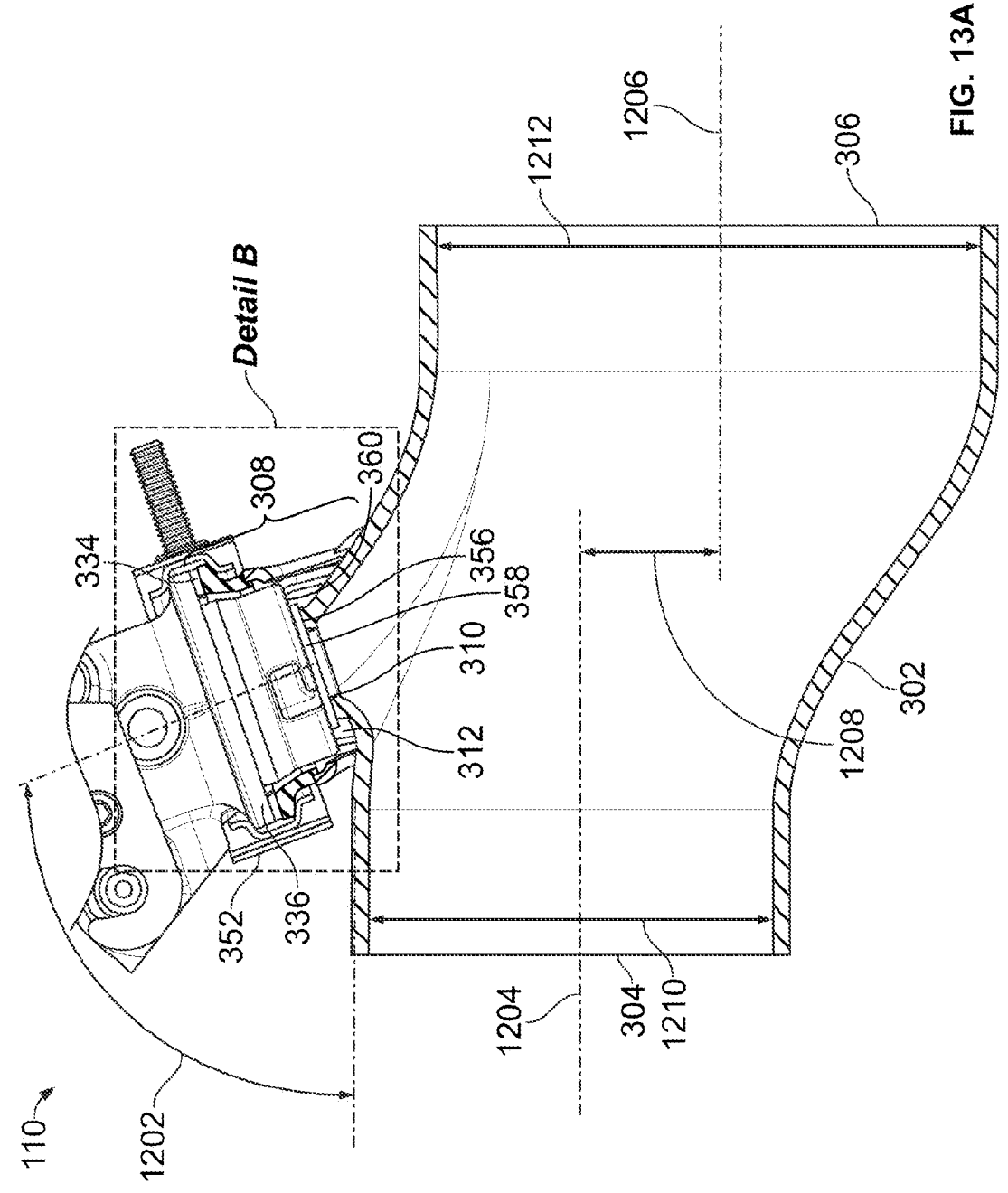
FIG. 13A is a cross-sectional view of a portion of the exhaust conduit assembly in FIG. 12.
Figure 13B:
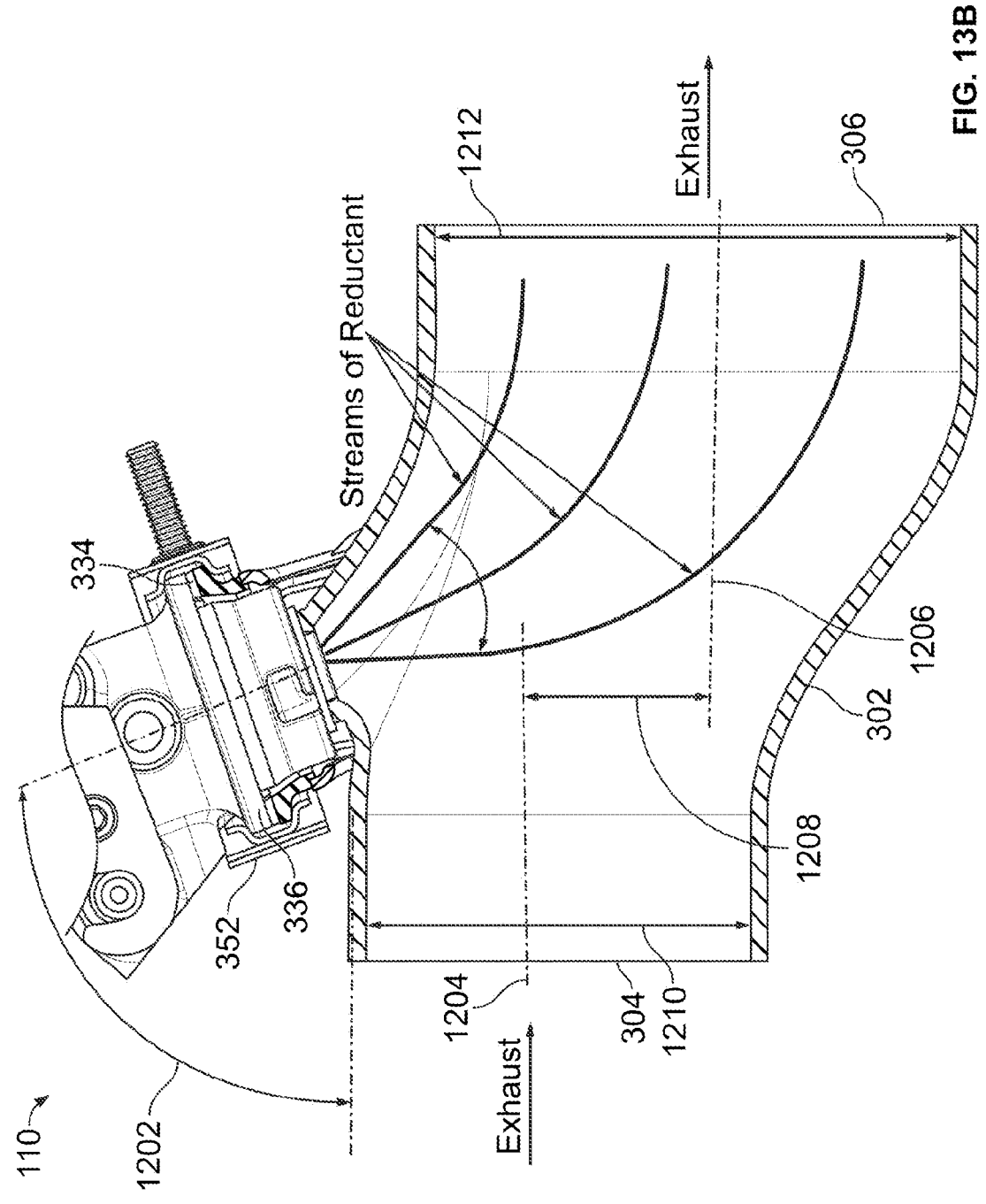
FIG. 13B is a cross-sectional view of a portion of the exhaust conduit assembly in FIG. 12.
Figure 15:
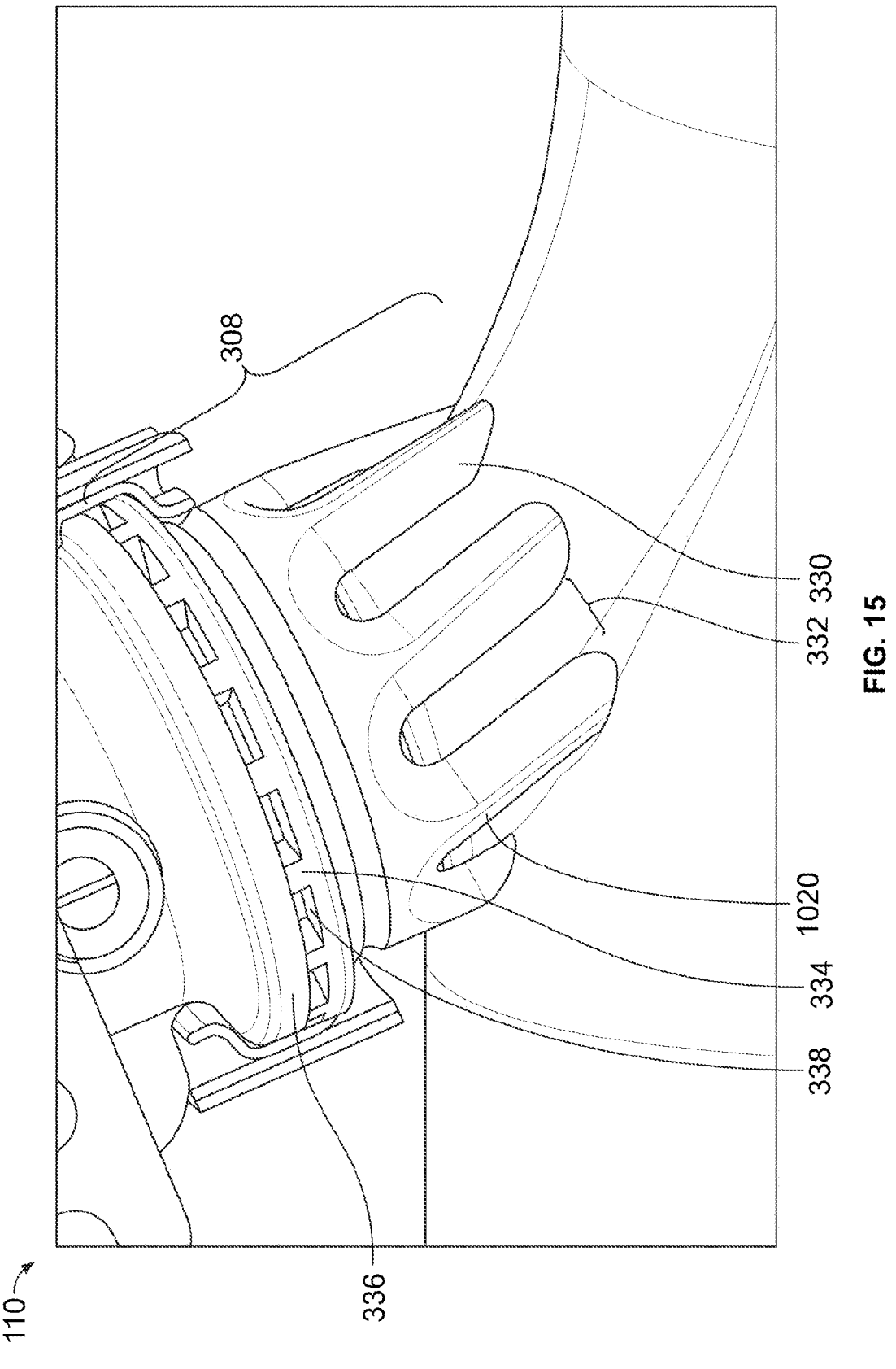
FIG. 15 is a side view of another exhaust conduit assembly for an exhaust aftertreatment system.

In some embodiments, the legs 330 may extend straight from the lower portion 1006, as shown in FIG. 12. The legs 330 may also extend straight from the lower portion 1006 but also have a bend 1020, as shown in FIG. 15. The bend 1020 may provide some spring effect within the doser mount 308.

In some embodiments, the doser mount 308 is disposed at an angle 1202, as shown in FIGS. 12-15. For example, the legs 330 of the doser mount 308 may have different lengths to facilitate the desired angle of the doser mount 308 relative to the exhaust conduit body 302. Positioning the doser mount 308 at an angle 1022 may improve reductant introduction into the exhaust in the exhaust conduit body 302. For example, the angle 1022 may be determined to reduce reductant wall contact and facilitate homogeneous distribution within the exhaust conduit body 302. The angle 1022 may be, for example, between 45-90 degrees. The angle 1022 may be based on exhaust velocity, pipe size, reductant dosing rate, and reductant spray values, among others.

Some embodiments include an offset configuration for the exhaust conduit body 302 to further facilitate improved reductant introduction into the exhaust. For example, the offset configuration may include the exhaust conduit body 302 having an inlet center axis 1204 disposed at a first location and having an outlet center axis 1206 disposed at a second location. The exhaust conduit body 302 includes an offset 1208 between the first location and the second location. The offset 1208 may be based, at least partially, on a pipe size (e.g., diameter(s)) of the exhaust conduit body 302 of the inlet 304 and the outlet 306. For example, the inlet 304 may have an inlet diameter 1210 and the outlet 306 may have an outlet diameter 1212. The inlet diameter 1210 may be different than the outlet diameter 1212. The offset 1208 may also be based, at least partially, on the angle 1202, a spray angle, a droplet size of the reductant or reductant mixture, droplet speed, and velocity of exhaust gas, among others. The offset 1208 may be determined to improve chemical reactions between the reductant and other substances within the exhaust aftertreatment system 100 as well as to reduce a number of deposits that form on the side walls of the exhaust conduit body 302.

Figure 16:
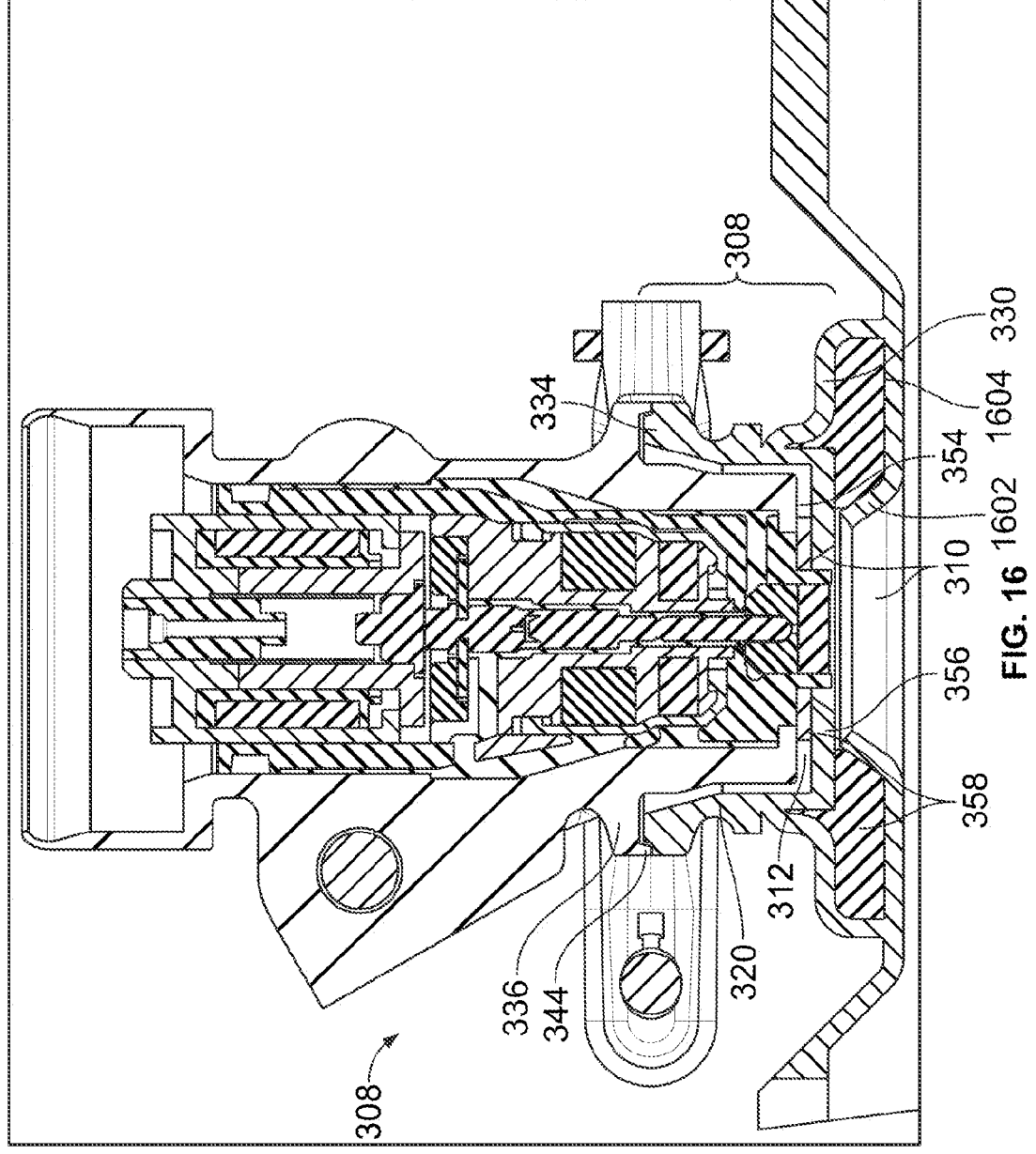
FIG. 16 is a cross-sectional view of another exhaust conduit assembly for an exhaust aftertreatment system.

FIG. 16 illustrates the exhaust conduit body 302 having a raised portion 1602. The raised portion 1602 may define a first injection aperture 310. A second injection aperture 310 may be separate from the first injection aperture 310 and be defined by the base 356 of the doser mount 308. The base 356 may be separate from the outer surface of the exhaust conduit body 302. The doser mount 308 may be disposed above the raised portion 1602 such that the upstream dosing module 116 may be aligned with both the first and second injection apertures 310. The legs 330 may extend from the exhaust conduit body 302 to the annular body portion 320. The legs 330 may define a lower cavity 1604 disposed between the legs 330 and the outer surface of the exhaust conduit body 302. An insulator 358 may be disposed in the lower cavity 1604 for additional thermal insulation between the doser mount 308 and the exhaust conduit body 302.

Figure 17A:
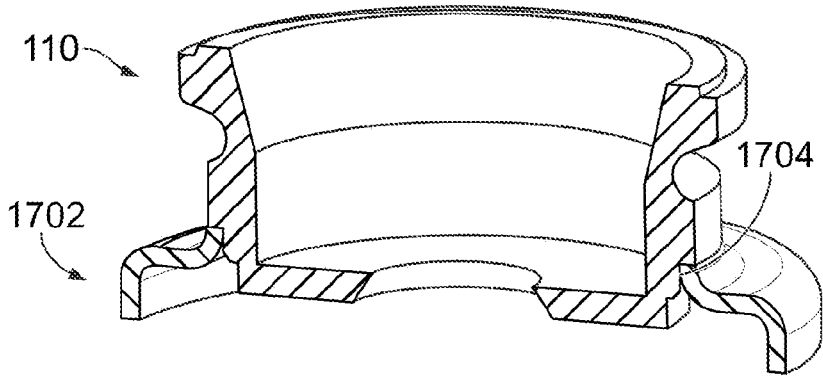
FIG. 17A is a cross-sectional view of a portion of an exhaust aftertreatment system.
Figure 17B:
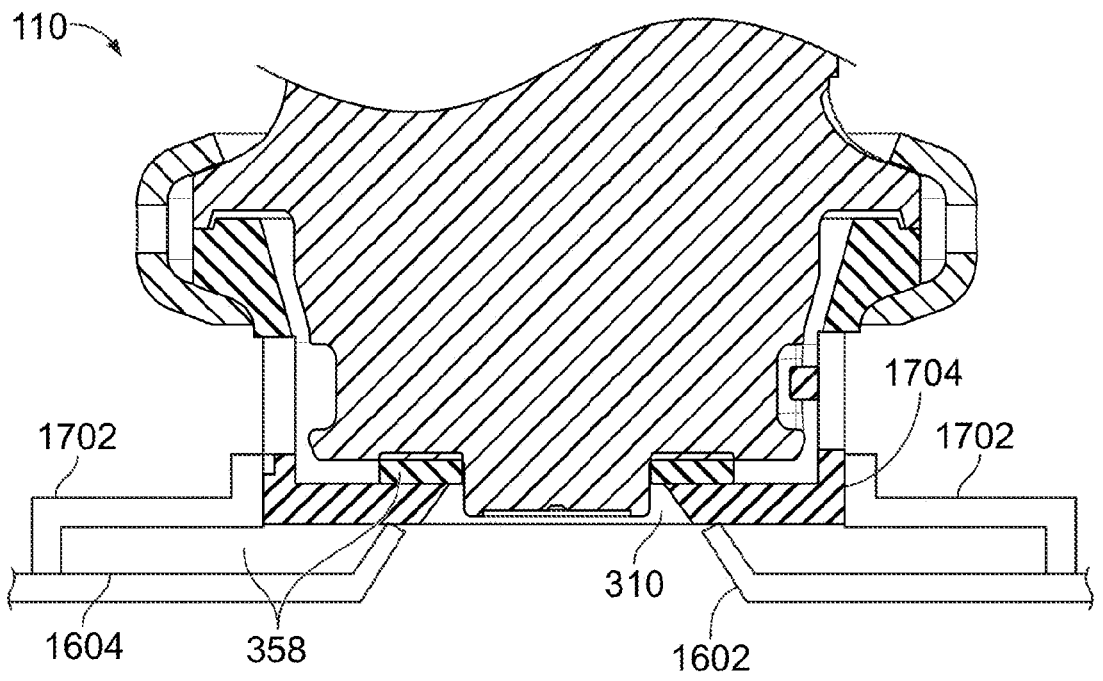
FIG. 17B is a cross-sectional view of another exhaust conduit assembly for an exhaust aftertreatment system.

FIGS. 17A-17B illustrate a top member 1702 for use with the exhaust conduit assembly 110. The top member 1702 may have a partial double wall that defines a recess 1704 configured to receive at least one of a doser mount 308 or an upstream dosing module 116. The top member 1702 may be configured to support the doser mount 308. The top member 1702 may replace the legs 330 of the doser mount 308. For example, the top member 1702 may provide a path for the heat to travel from the exhaust conduit body 302 to the annular body portion 320 of the doser mount 308. The top member 1702 may extend around the doser mount 308.

IV. Configuration of Example Embodiments

As utilized herein, an area is measured along a plane (e.g., a two-dimensional plane, etc.) unless otherwise indicated. This area may change in a direction that is not disposed along the plane (e.g., along a direction that is orthogonal to the plane, etc.) unless otherwise indicated.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "configured to receive exhaust from," "configured to receive air from," "configured to receive reductant from," and the like, as used herein, mean the two components or objects have a pathway formed between the two components or objects in which a fluid, such as air, reductant, an air-reductant mixture, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. A doser mount comprising:
an annular body portion defining a central cavity configured to receive a portion of a doser,
a plurality of legs protruding downward from a lower surface of the annular body portion at a plurality of circumferential positions of the lower surface of the annular body portion and configured to be coupled to an outer surface of an exhaust conduit body, wherein the plurality of legs are spaced from each other so as to define a plurality of lower channels, each lower channel located between adjacent ones of the plurality of legs and the lower surface of the annular body portion, and each lower channel configured to facilitate passage of air into and through an annular central cavity located between the annular body portion and an outer surface of the doser when the doser is received in the central cavity of the annular body portion; and
a plurality of projections protruding upward from an upper surface of the annular body portion at a plurality of circumferential positions of the upper surface of the annular body portion and configured to interface with a flange of the doser, wherein the plurality of projections are spaced from each other so as to define a plurality of upper channels, each upper channel located between adjacent ones of the plurality of projections and the upper surface of the annular body portion, and each upper channel configured to facilitate passage of air into and through the annular central cavity.

2. The doser mount of claim 1, further comprising:
a first member comprising a lower portion of the annular body portion and the plurality of legs; and
a second member attached to the first member and comprising an upper portion of the annular body portion and the plurality of projections.

3. The doser mount of claim 1, wherein:
the annular body portion, the plurality of legs, and the plurality of projections are formed as a single monolithic structure.

4. An exhaust aftertreatment system comprising:
the doser,
the exhaust conduit body, and
the doser mount of claim 1, wherein:
the plurality of legs comprises a leg that defines a first route for heat to travel from the exhaust conduit body to the annular body portion; and
the plurality of projections comprise a projection that defines a second route for the heat to travel from the annular body portion to the doser.

5. The doser mount of claim 1, wherein:
the lower surface of the annular body portion extends radially outward from the annular body portion, each of the plurality of legs extends radially between the central cavity and an outer edge of the lower surface of the annular body portion; and
the upper surface of the annular body portion extends radially outward from the annular body portion, each of the plurality of projections extending radially between the central cavity and an outer edge of the upper surface of the annular body portion.

6. The doser mount of claim 1, wherein at least one projection of the plurality of projections comprises a step configuration in which an inner portion of the at least one projection extends further away from the upper surface than an outer portion of the at least one projection.

7. The doser mount of claim 1, wherein:
the annular body portion comprises a plurality of ribs that each extend between the lower surface of the annular body portion and the upper surface of the annular body portion, the plurality of ribs comprising:
a first rib, and
a second rib adjacent the first rib, the second rib cooperating with the first rib, the upper surface of the annular body portion, and the lower surface of the annular body portion to define a central channel configured to facilitate passage of air into the central cavity.

8. An exhaust aftertreatment system comprising:

the exhaust conduit body, and the doser mount of claim 1, wherein each leg of the plurality of legs includes:

a first portion extending from the annular body portion and away from the exhaust conduit body;

a second portion extending from the first portion towards the exhaust conduit body.

9. An exhaust aftertreatment system comprising:

the doser, which comprises an injector; and the doser mount of claim 1; wherein:

the doser is coupled to the doser mount such that the injector is received within the central cavity.

10. The exhaust aftertreatment system of claim 9, further comprising:

the exhaust conduit body; wherein:

the annular body portion, the plurality of legs, and the exhaust conduit body are formed as a single monolithic structure.

11. The exhaust aftertreatment system of claim 10, further comprising:

a first member comprising a lower portion of the annular body portion and the plurality of legs; and a second member attached to the first member and comprising an upper portion of the annular body portion and the plurality of projections.

12. The exhaust aftertreatment system of claim 10, wherein the doser comprises the flange, the flange and the plurality of projections configured to position the doser away from an inner wall of the annular body portion.

13. The exhaust aftertreatment system of claim 12, wherein:

at least one projection of the plurality of projections comprises a step configuration with a raised inner portion and a lower outer portion;

the flange comprises a tip that extends axially from the flange toward the doser mount; and the tip interfaces with the lower outer portion of the at least one projection and maintains a space between the flange and the raised inner portion.

14. The exhaust aftertreatment system of claim 10, wherein:

the doser mount comprises a base defining a first injection aperture; and the exhaust conduit body comprises a raised portion defining a second injection aperture aligned with and separated from the first injection aperture.

15. The exhaust aftertreatment system of claim 10, wherein the doser mount is positioned at an angle relative to the exhaust conduit body to introduce reductant to exhaust within the exhaust conduit body at a desired angle.

16. An exhaust aftertreatment system comprising:

the exhaust conduit body; and the doser mount of claim 1; wherein:

the plurality of legs cooperate with the exhaust conduit body to define the plurality of lower channels between the lower surface of the annular body portion and the exhaust conduit body.

17. The exhaust aftertreatment system of claim 16, further comprising:

the doser, which comprises an injector; wherein:

the plurality of projections cooperate with the doser to define the plurality of upper channels between the upper surface of the annular body portion and the doser.

* * * * *